(12) United States Patent
Yoshitsugu

(10) Patent No.: US 7,126,762 B2
(45) Date of Patent: Oct. 24, 2006

(54) ZOOM LENS SYSTEM, IMAGING DEVICE, AND CAMERA

(75) Inventor: Keiki Yoshitsugu, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/229,828

(22) Filed: Sep. 20, 2005

(65) Prior Publication Data

US 2006/0061876 A1 Mar. 23, 2006

(30) Foreign Application Priority Data

Sep. 21, 2004 (JP) ............................. 2004-274018

(51) Int. Cl.
*G02B 15/14* (2006.01)
(52) U.S. Cl. ................... 359/687; 359/557; 359/683; 359/684; 359/715; 359/685; 359/774
(58) Field of Classification Search ............... 359/557, 359/683–687, 715, 774
See application file for complete search history.

(56) References Cited

U.S. PATENT DOCUMENTS

| | | | | |
|---|---|---|---|---|
| 5,000,551 A | * | 3/1991 | Shibayama | 359/687 |
| 5,872,659 A | * | 2/1999 | Kohno | 359/683 |
| 6,010,537 A | * | 1/2000 | Konno et al. | 359/389 |
| 6,519,094 B1 | * | 2/2003 | Boku et al. | 359/687 |
| 6,535,339 B1 | * | 3/2003 | Miyauchi | 359/687 |
| 6,577,450 B1 | * | 6/2003 | Hamano et al. | 359/687 |
| 6,633,437 B1 | | 10/2003 | Hoshi et al. | |
| 6,650,475 B1 | * | 11/2003 | Hamano | 359/557 |
| 6,867,925 B1 | | 3/2005 | Sato | |
| 2002/0063961 A1 | * | 5/2002 | Hamano et al. | 359/557 |
| 2002/0063969 A1 | * | 5/2002 | Hamano et al. | 359/687 |
| 2003/0063395 A1 | | 4/2003 | Saruwatari | |
| 2003/0189763 A1 | * | 10/2003 | Horiuchi | 359/687 |
| 2003/0197952 A1 | | 10/2003 | Eguchi | |
| 2003/0227691 A1 | | 12/2003 | Saruwatari | |
| 2003/0231388 A1 | | 12/2003 | Hamano et al. | |
| 2004/0032670 A1 | | 2/2004 | Eguchi | |
| 2004/0056969 A1 | | 3/2004 | Hamano et al. | |
| 2004/0136086 A1 | | 7/2004 | Ohtake | |

FOREIGN PATENT DOCUMENTS

JP  A-2000-347102  6/1999

(Continued)

*Primary Examiner*—Evelyn A. Lester
(74) *Attorney, Agent, or Firm*—McDermott Will & Emery LLP

(57) ABSTRACT

A zoom lens system, in order from the object side to the image side, comprises a first lens unit G1 having positive optical power, a second lens unit G2 having negative optical power, a third lens unit G3 having positive optical power and a fourth lens unit G4 having positive optical power. Magnification varying is performed by varying the distances between the lens units by moving the lens units along the optical axis. The third lens unit G3 comprises at least two lens elements including a third lens unit object side lens element which is a positive lens element disposed on the most object side and whose high-curvature surface faces the object side and a third lens unit image side lens element which is a negative lens element disposed on the most image side and concave to the image side. The zoom lens system satisfies predetermined conditions, and in which the magnification variation ratio is approximately 5 to 6x, the overall lengths at the time of shooting and at the time of non-shooting are short and resolution is high.

19 Claims, 13 Drawing Sheets

FOREIGN PATENT DOCUMENTS

| | | |
|---|---|---|
| JP | A-2002-14284 | 6/2000 |
| JP | 2001-13411 A | 1/2001 |
| JP | 2001-42215 A | 2/2001 |
| JP | A-2003-43357 | 8/2001 |
| JP | 2002-72087 A | 3/2002 |
| JP | A-2003-295059 | 4/2002 |
| JP | A-2003-315676 | 4/2002 |
| JP | A-2004-12639 | 6/2002 |
| JP | A-2004-94233 | 8/2002 |
| JP | A-2004-109653 | 9/2002 |
| JP | 2004-212616 A | 7/2004 |

* cited by examiner

F 2.87
d-LINE
F-LINE
C-LINE

W 30.55
s
m

W 30.55

F 3.46

W 13.08

W 13.08

F 4.88

W 5.52

W 5.52

SPHERICAL ABERRATION (mm)   ASTIGMATISM (mm)   DISTORTION (%)

F 2.88 d-LINE
F-LINE
C-LINE
-.10  .0  .10

W 31.24 s
m
-.10  .0  .10

W 31.24

-5.0  .0  5.0

F 3.83

-.10  .0  .10

W 13.22

-.10  .0  .10

W 13.22

-5.0  .0  5.0

F 6.06

-.10  .0  .10
SPHERICAL ABERRATION (mm)

W 5.64

-.10  .0  .10
ASTIGMATISM (mm)

W 5.64

-5.0  .0  5.0
DISTORTION (%)

SPHERICAL ABERRATION (mm)     ASTIGMATISM (mm)     DISTORTION (%)

F 2.90 d-LINE
F-LINE
C-LINE

-.10  .0  .10

W 30.61 s  m

-.10  .0  .10

W 30.61

-5.0  .0  5.0

F 3.45

-.10  .0  .10

W 13.01

-.10  .0  .10

W 13.01

-5.0  .0  5.0

F 5.06

-.10  .0  .10

SPHERICAL ABERRATION (mm)

W 5.51

-.10  .0  .10

ASTIGMATISM (mm)

W 5.51

-5.0  .0  5.0

DISTORTION (%)

ZOOM LENS SYSTEM, IMAGING DEVICE, AND CAMERA

CROSS-REFERENCE TO RELATED APPLICATION

This application is based on application No. 2004-274018 filed in Japan on Sep. 21, 2004, the content of which is hereby incorporated by reference.

BACKGROUND

1. Technical Field

The present invention relates to a zoom lens system, an imaging device and a camera, and more particularly, to a small-size and high-image-quality zoon lens system suitable for digital still cameras, digital video cameras and the like, an imaging device having the zoom lens system, and the camera having the imaging device.

2. Description of the Background Art

In digital still cameras using a solid-state image sensor such as a CCD (charge coupled device) or a CMOS (complementary metal-oxide semiconductor), since a member such as an optical low-pass filter is disposed between the rearmost part of the lens elements and the solid-state image sensor, a lens system having a comparatively long back focal length is required. Moreover, the taking optical system of digital still cameras is required of an excellent telecentric characteristic in order to avoid shading which is a factor that decreases the quantity of peripheral light on the image surface.

Many forms of digital still cameras can be considered, and one form is a compact type. As the zoom lens system, one that is higher in magnification and imaging performance has been required. As zoom lens system suitable for the compact type, there have been proposed many three-unit zoom lens systems comprising from the object side a first lens unit having negative optical power, a second lens unit having positive optical power and a third lens unit having positive optical power. In the case of a magnification variation ratio of approximately 3×, these three-unit zoom lens systems can be formed so as to be compact and wide in the angle of view at the wide-angle limit. However, since the F-number at the telephoto limit is higher than that at the wide-angle limit, these three-unit zoom lens systems cannot be formed so as to be high in magnification.

Therefore, as zoom lens systems with which a comparatively high magnification is obtained without the F-number at the telephoto limit being much higher than that at the wide-angle limit, there have been proposed many four-unit zoom lens systems comprising from the object side a first lens unit having a positive refractive index, a second lens unit having a negative refractive index, and a third lens unit and a fourth lens unit each having a positive refractive index, for example, as described in Japanese Laid-Open Patent Publications Nos. 2001-13411, 2001-42215, 2002-72087 and 2004-212616.

However, in the zoom lens systems described in Japanese Laid-Open Patent Publication No. 2001-13411, although a magnification variation ratio of approximately 6× is obtained, since the number of lens elements is large, it is difficult to make the zoom lens systems compact when not in use. In the zoom lens systems described in Japanese Laid-Open Patent Publication No. 2001-42215, although the number of lens elements is small and it is therefore possible to make the zoom lens systems compact when not in use, the magnification variation ratio is as low as approximately 3×.

In the zoom lens systems described in Japanese Laid-Open Patent Publication No. 2002-72087, the magnification variation ratio is approximately 3×, and in the zoom lens systems described in Japanese Laid-Open Patent Publication No. 2004-212616, the magnification ratio is approximately 4×.

SUMMARY

An object of the present invention is to provide an improved zoom lens system and an imaging device using the zoom lens system.

An object of the present invention is to provide a zoom lens system in which the magnification variation ratio is approximately 5 to 6×, the angle of view at the wide-angle limit is 60° to 65°, the overall lengths at the time of shooting and at the time of non-shooting are short and resolution is high, and an imaging device using the zoom lens system. Moreover, an object of the present invention is to provide a camera having the imaging device.

The novel concepts disclosed herein were achieved in order to solve the foregoing problems in the conventional art, and herein is disclosed: a zoom lens system, in order from an object side to an image side, comprises a first lens unit having positive optical power; a second lens unit having negative optical power; a third lens unit having positive optical power; and a fourth lens unit having positive optical power, collectively referred to as lens units, wherein, magnification varying is performed by varying distances along an optical axis between at least any two of the lens units, during magnification varying from a wide-angle limit to a telephoto limit, the third lens unit moves to the object side, and the first and second lens units move with locus of a convex to the image side, the third lens unit comprises at least two lens elements including a third lens unit object side lens element which is a positive lens element disposed at a position closest to the object side and whose high-curvature surface faces the object side and a third lens unit image side lens element which is a negative lens element disposed at a position closest to the image side and concave in relation to the image side, and the following conditions are satisfied:

$$7.0 < L_W/f_W < 9.0 \tag{1}$$

$$1.5 < L_T/f_T < 2.1 \tag{2}$$

(here, $Z = f_T/f_W > 5.0$)

where $L_W$ is an optical overall length at a wide-angle limit, $f_W$ is a focal length of an entire lens system at the wide-angle limit, $L_T$ is an optical overall length at a telephoto limit, and $f_T$ is a focal length of the entire lens system at the telephoto limit.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

First to Fourth Embodiments

Figure 1A:
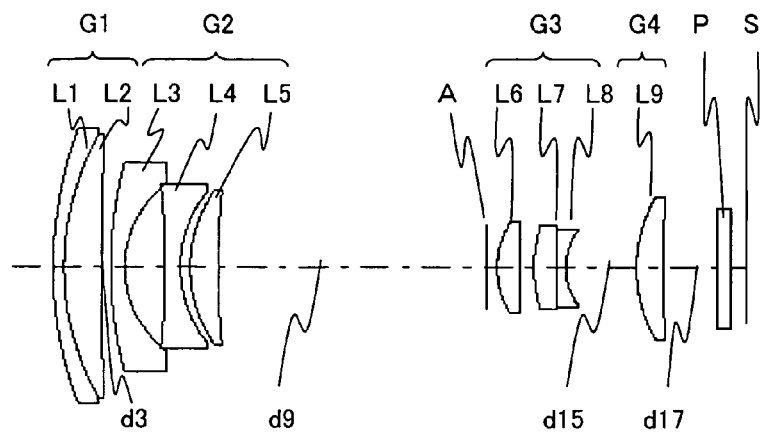
FIGS. 1A to 1C are construction views of a zoom lens system according to a first embodiment (first example)
Figure 1B:
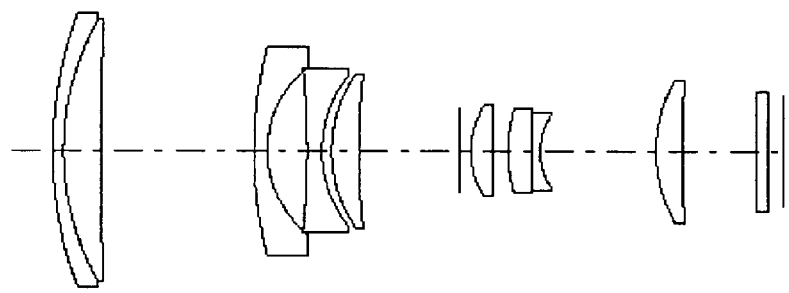
Figure 1C:
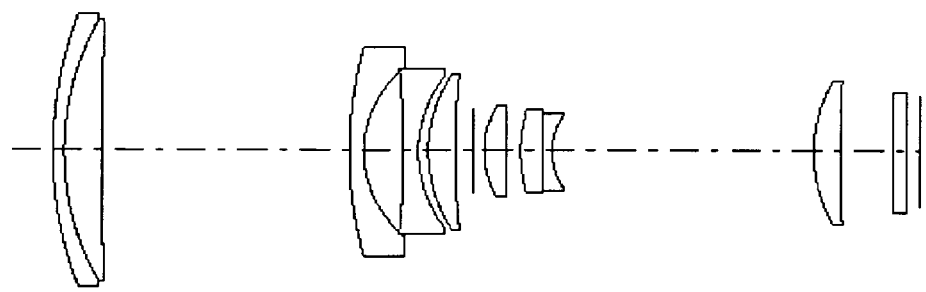
Figure 2A:
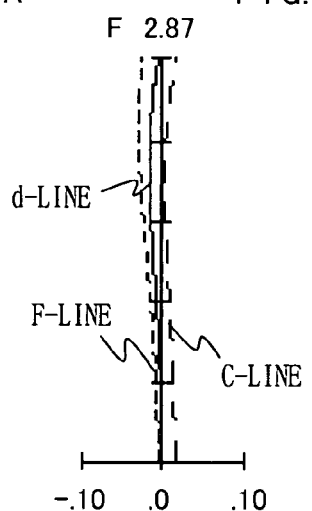
FIGS. 2A to 2I are graphic representations of longitudinal aberrations of the zoom lens system according to the first example.
Figure 2B:
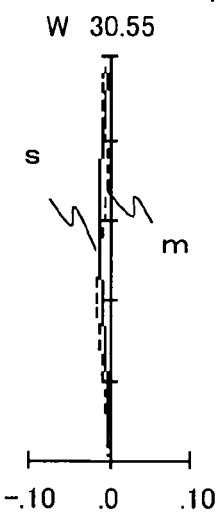
Figure 2C:
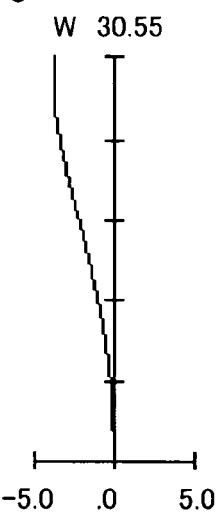
Figure 2D:
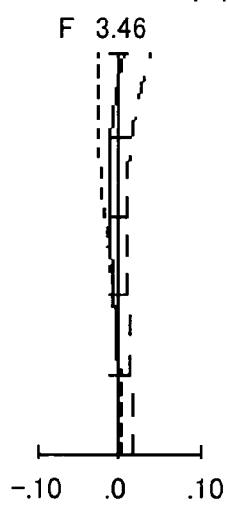
Figure 2E:
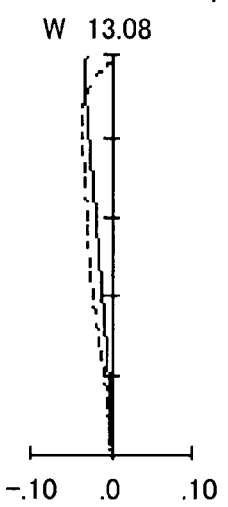
Figure 2F:
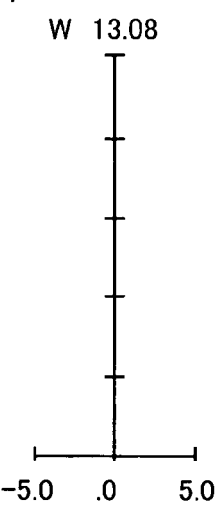
Figure 2G:
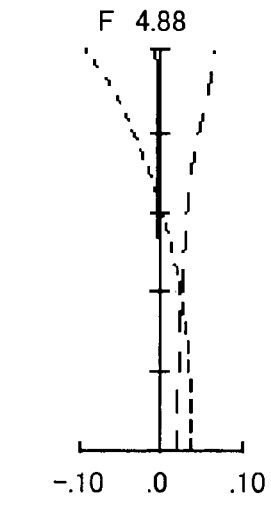
Figure 2H:
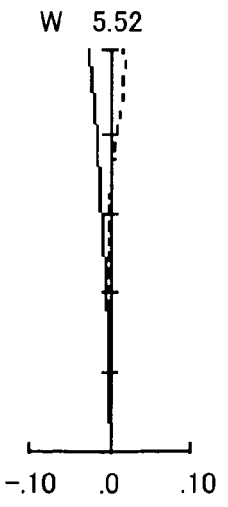
Figure 2I:
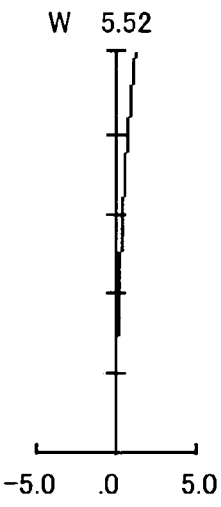
Figure 3A:
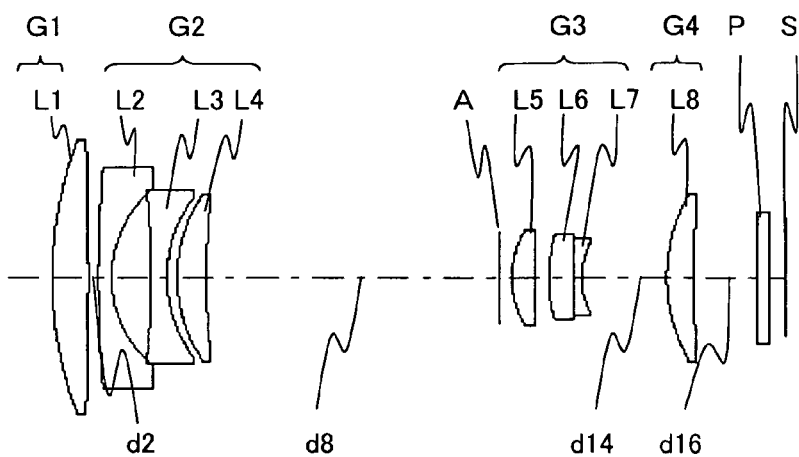
FIGS. 3A to 3C are construction views of a zoom lens system according to a second embodiment (second example)
Figure 3B:
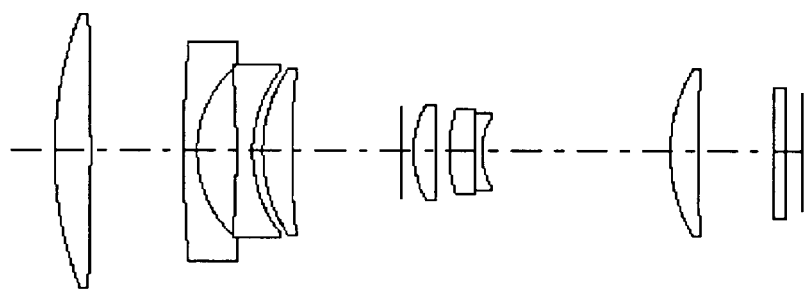
Figure 3C:
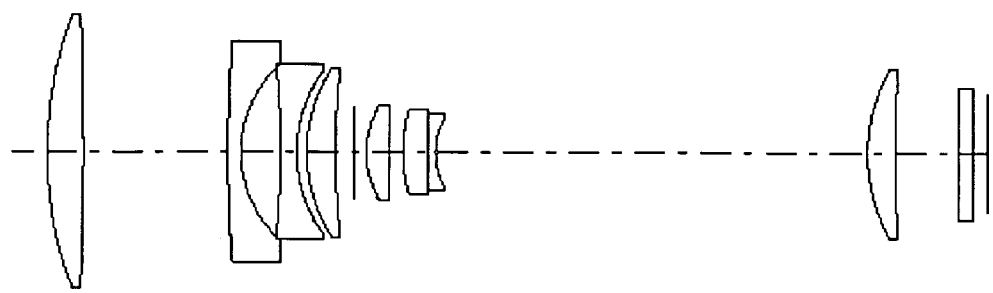
Figure 4A:
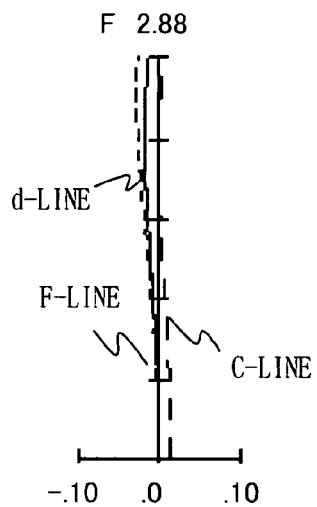
FIGS. 4A to 4I are graphic representations of longitudinal aberrations of the zoom lens system according to the second example.
Figure 4B:
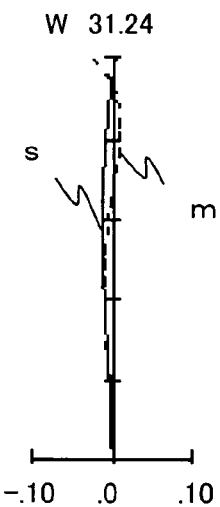
Figure 4C:
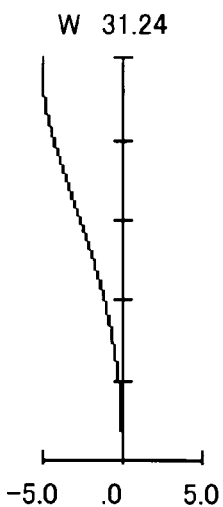
Figure 4D:
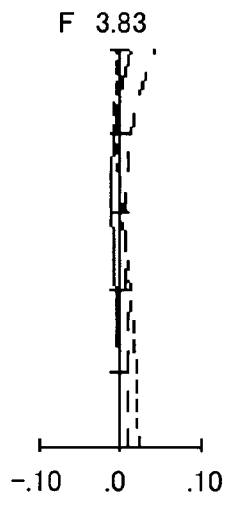
Figure 4E:
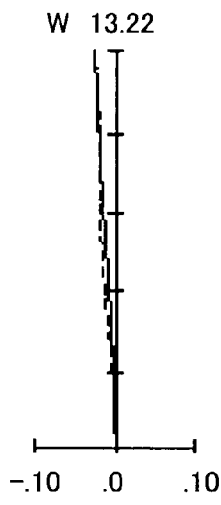
Figure 4F:
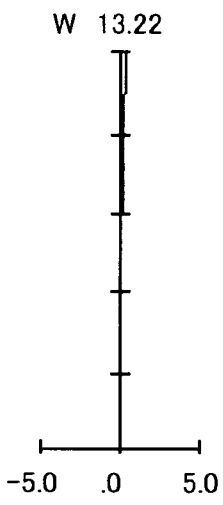
Figure 4G:
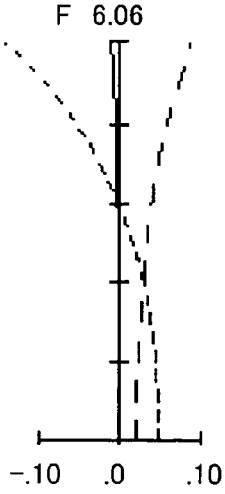
Figure 4H:
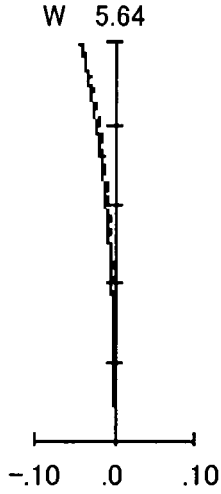
Figure 4I:
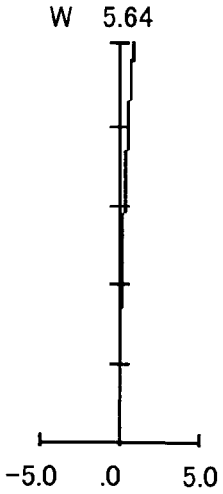
Figure 5A:
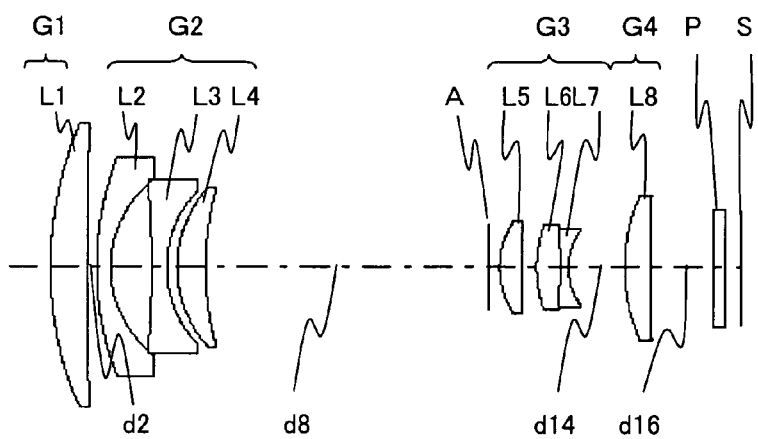
FIGS. 5A to 5C are construction views of a zoom lens system according to a third embodiment (third example)
Figure 5B:
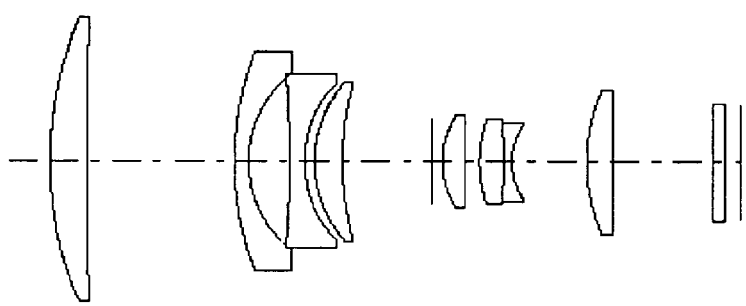
Figure 5C:
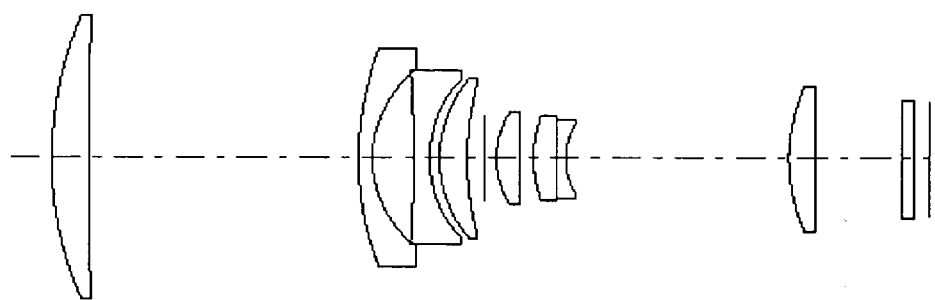
Figure 6A:
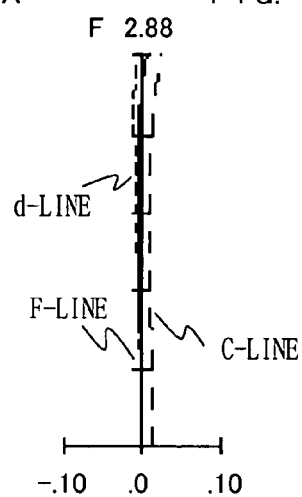
FIGS. 6A to 6I are graphic representations of longitudinal aberrations of the zoom lens system according to the third example.
Figure 6B:
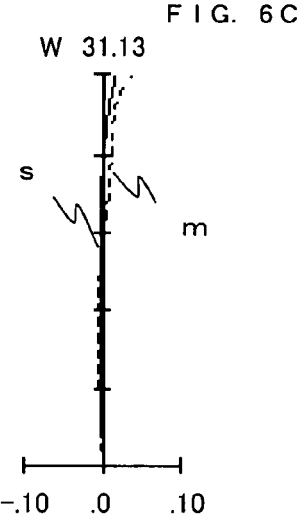
Figure 6C:
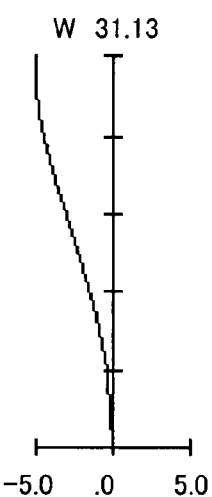
Figure 6D:
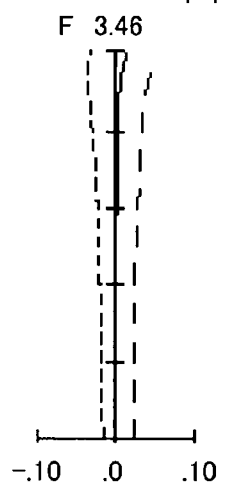
Figure 6E:
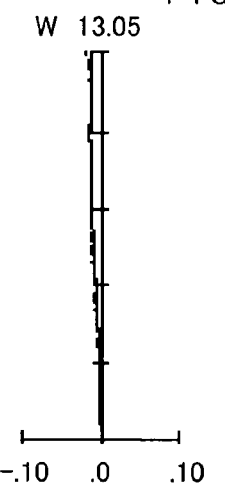
Figure 6F:
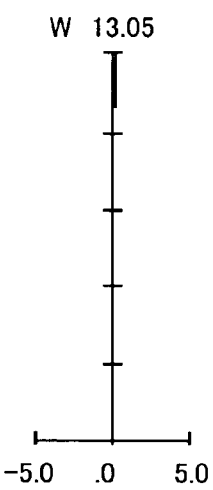
Figure 6G:
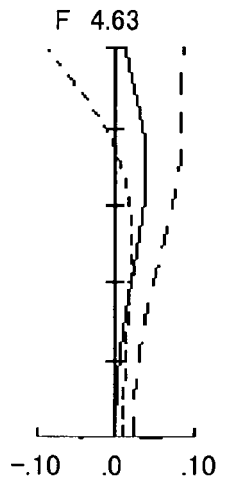
Figure 6H:
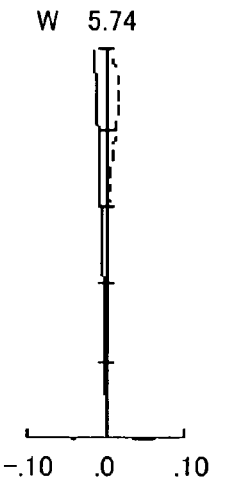
Figure 6I:
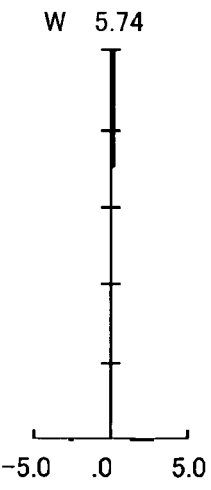
Figure 7A:
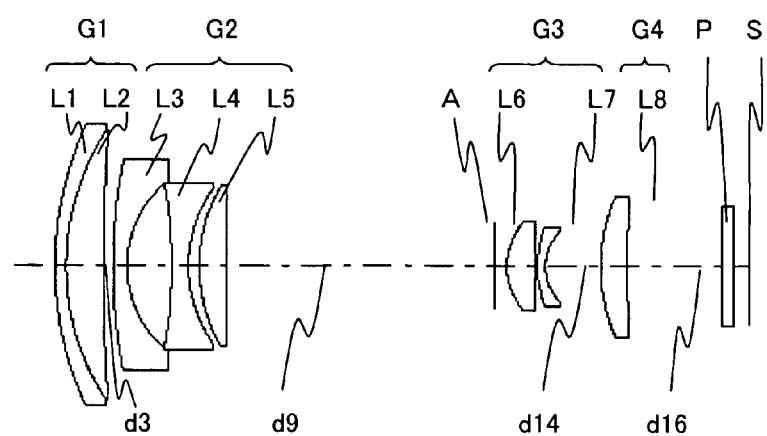
FIGS. 7A to 7C are construction views of a zoom lens system according to a fourth embodiment (fourth example)
Figure 7B:
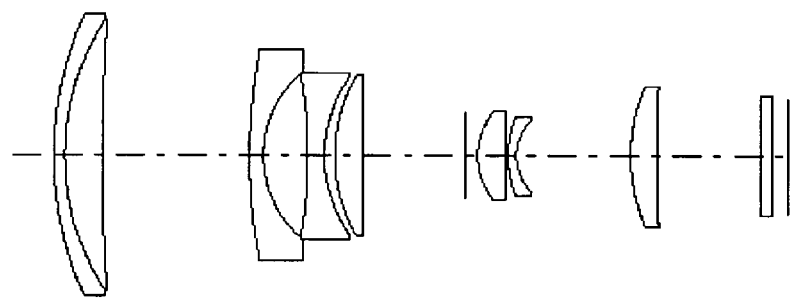
Figure 7C:
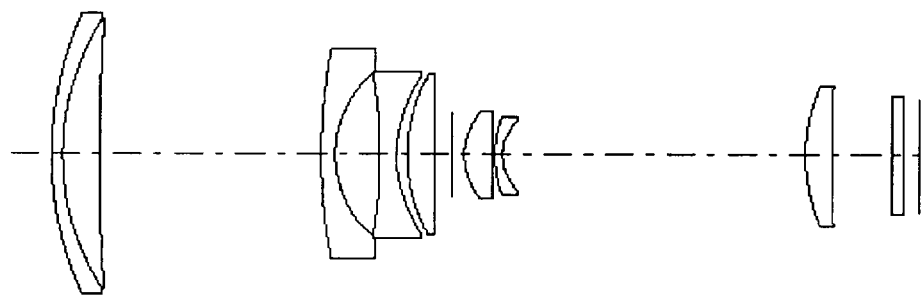
Figure 8A:
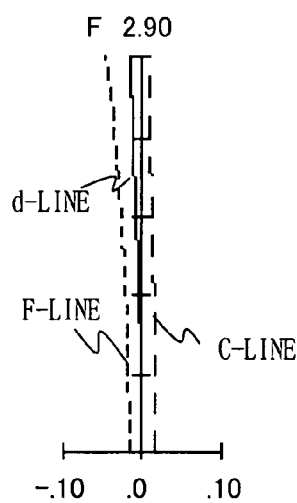
FIGS. 8A to 8I are graphic representations of longitudinal aberrations of the zoom lens system according to the fourth example.
Figure 8B:
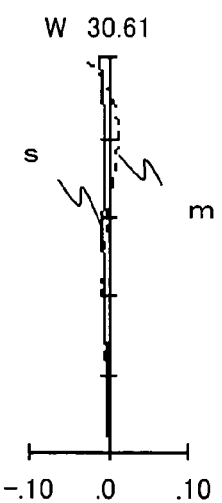
Figure 8C:
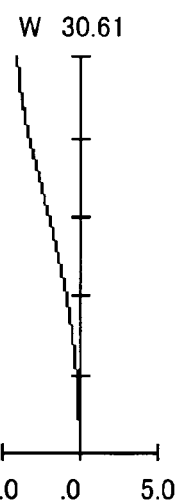
Figure 8D:
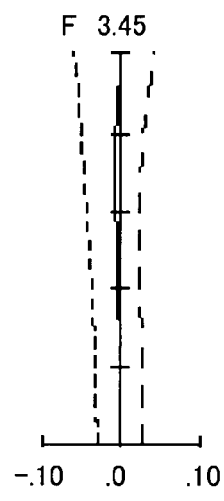
Figure 8E:
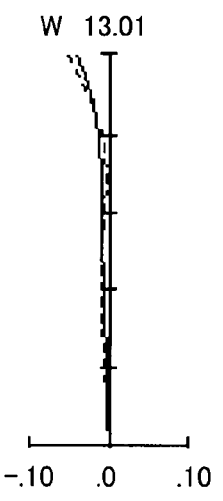
Figure 8F:
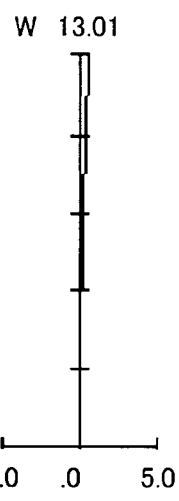
Figure 8G:
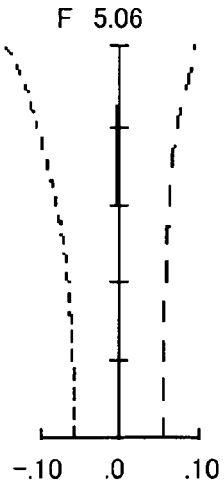
Figure 8H:
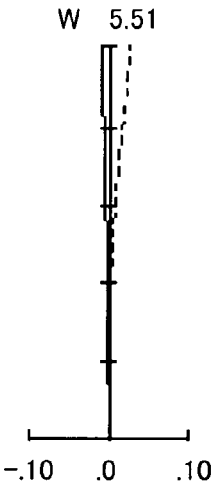
Figure 8I:
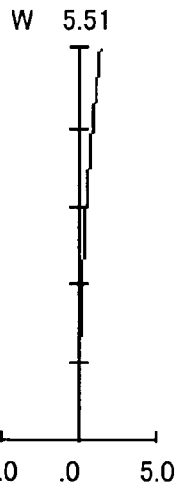
Figure 9A:
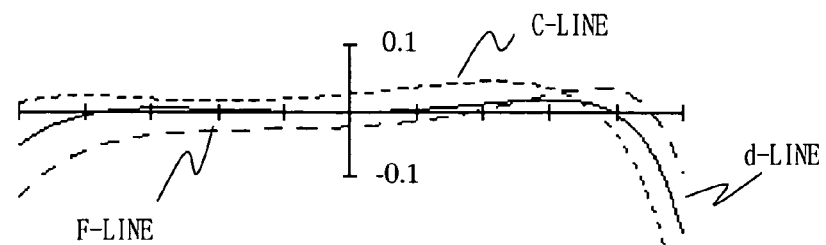
FIGS. 9A to 9F are graphic representations of lateral aberrations of the zoom lens system according to the first example at the telephoto limit.
Figure 9B:
Figure 9C:
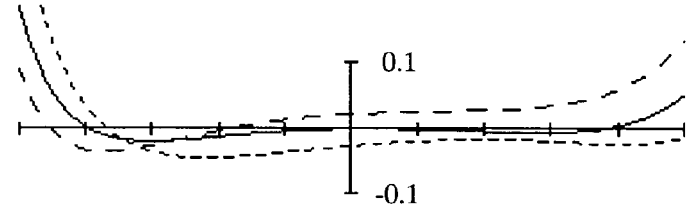
Figure 9D:
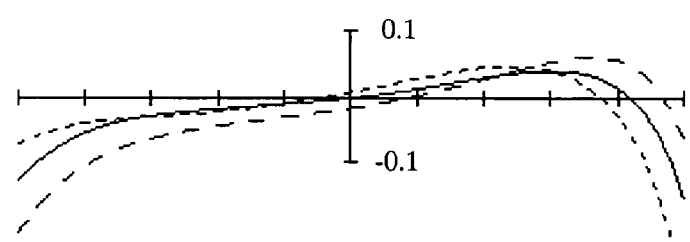
Figure 9E:
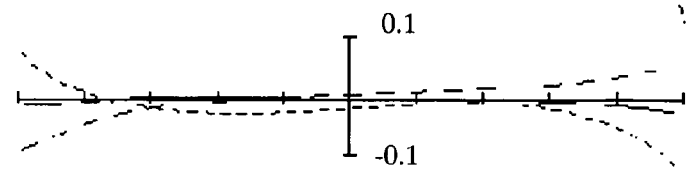
Figure 9F:
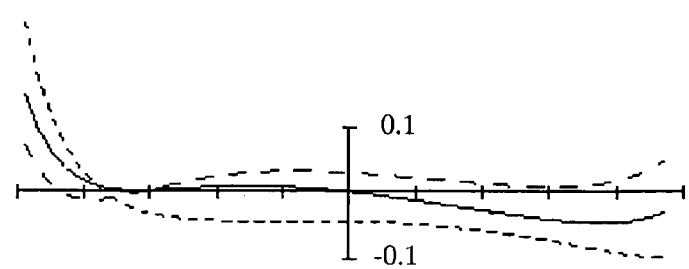
Figure 10A:
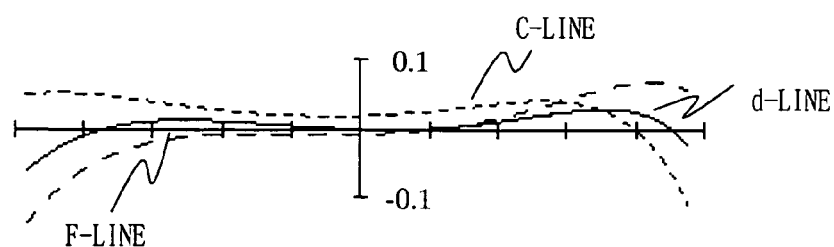
FIGS. 10A to 10F are graphic representations of lateral aberrations of the zoom lens system according to the second example at the telephoto limit.
Figure 10B:
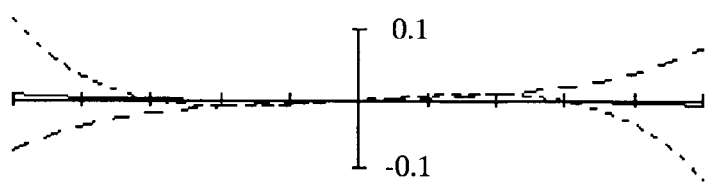
Figure 10C:
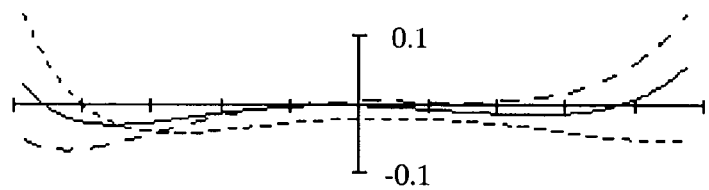
Figure 10D:
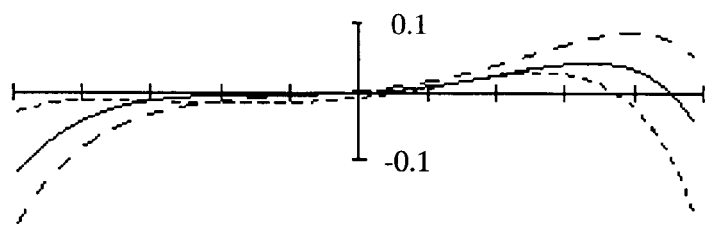
Figure 10E:
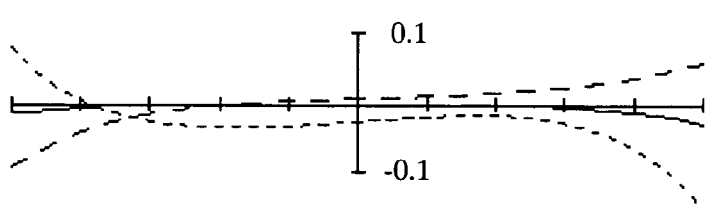
Figure 10F:
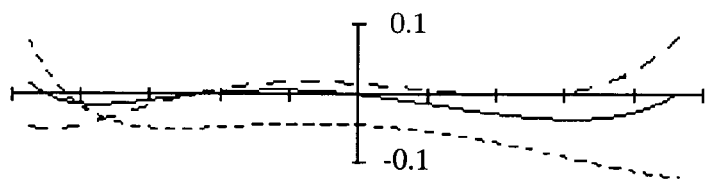
Figure 11A:
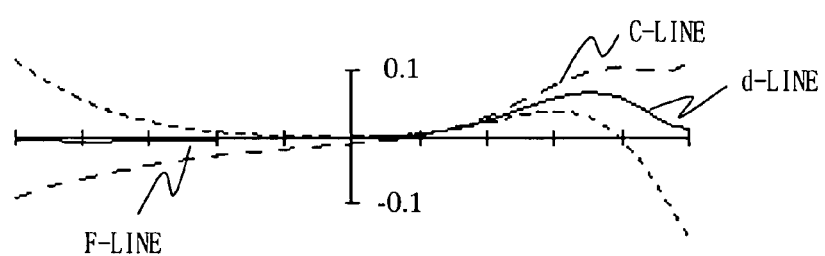
FIGS. 11A to 11F are graphic representations of lateral aberrations of the zoom lens system according to the third example at the telephoto limit.
Figure 11B:
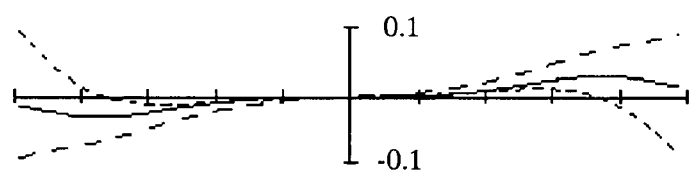
Figure 11C:
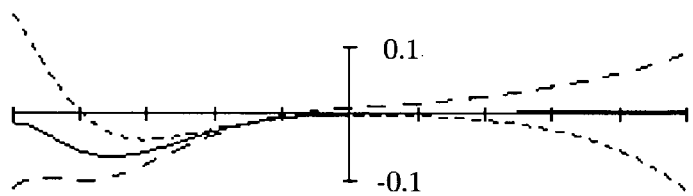
Figure 11D:
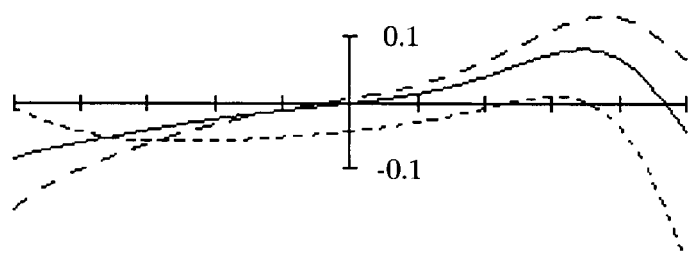
Figure 11E:
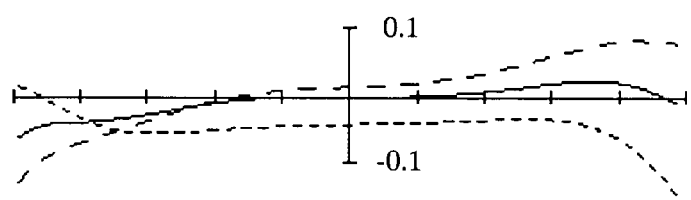
Figure 11F:
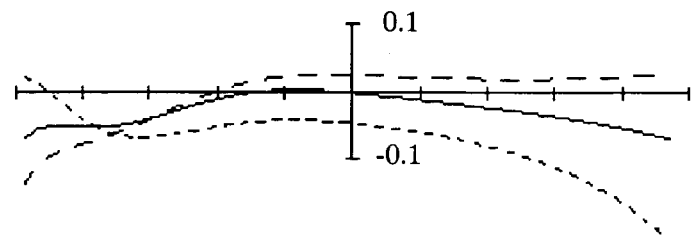
Figure 12A:
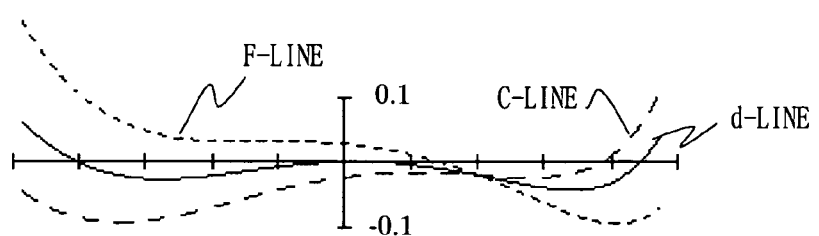
FIGS. 12A to 12F are graphic representations of lateral aberrations of the zoom lens system according to the fourth example at the telephoto limit.
Figure 12B:
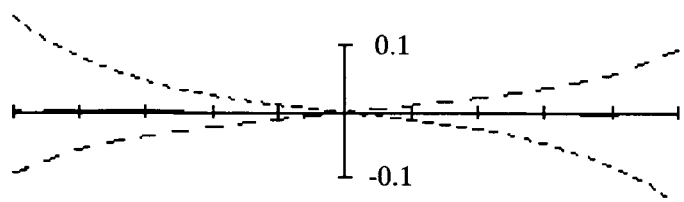
Figure 12C:
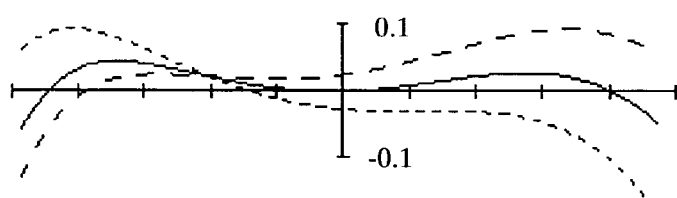
Figure 12D:
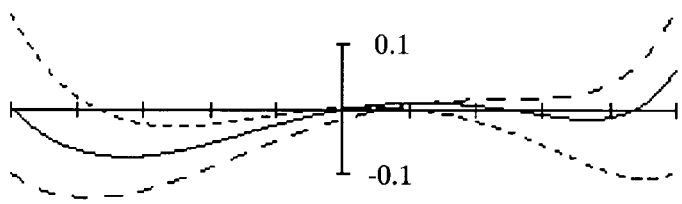
Figure 12E:
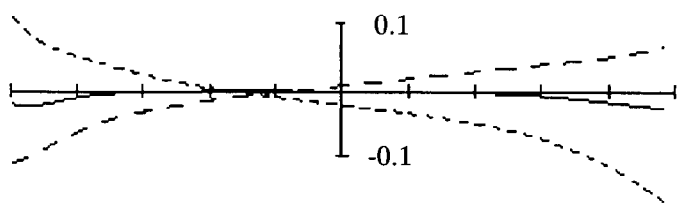
Figure 12F:
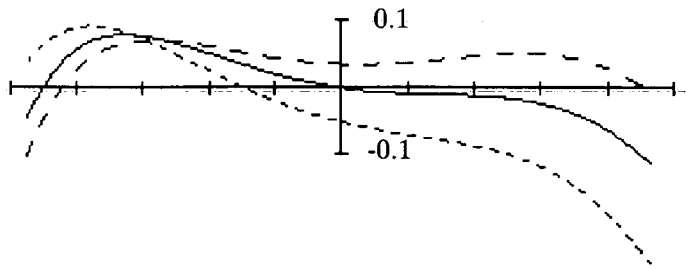

FIGS. 1A to 1C are construction views of a zoom lens system according to a first embodiment. FIGS. 3A to 3C are construction views of a zoom lens system according to a second embodiment. FIGS. 5A to 5C are construction views of a zoom lens system according to a third embodiment. FIGS. 7A to 7C are construction views of a zoom lens system according to a fourth embodiment. These figures each show a zoom lens system focused on infinity. FIGS. 1A, 3A, 5A and 7A show the lens construction at the wide-angle limit (the shortest focal length condition: the focal length $f_W$). FIGS. 1B, 3B, 5B and 7B show the lens construction at the middle position (the middle focal length condition: the focal length $f_M=\sqrt{(f_W*f_T)}$). FIGS. 1C, 3C, 5C and 7C show the lens construction at the telephoto limit (the longest focal length condition: the focal length $f_T$).

The zoom lens systems according to the first to fourth embodiments each, in order from the object side to the image side, comprise: a first lens unit G1 having positive optical power; a second lens unit G2 having negative optical power; a diaphragm A; a third lens unit G3 having positive optical power; and a fourth lens unit G4 having positive optical power. In the zoom lens systems according to the first to fourth embodiments, the lens units are moved along the optical axis in magnification varying from the wide-angle limit to the telephoto limit. In each of these figures, the straight line shown on the right most side indicates the position of the image surface S, and on the object side thereof, a plane parallel plate P equivalent to an optical low-pass filter, a phase plate of the image sensor or the like is disposed. In the zoom lens systems according to the first to fourth embodiments, by disposing the lens units in a desired power arrangement, the overall size of the lens system can be reduced while the optical performance is maintained.

In the zoom lens systems according to the first to fourth embodiments, the first lens unit G1 comprises one positive lens element or a doublet lent element consisting of a negative lens element and a positive lens element. The second lens unit G2, in order from the object side to the image side, comprises: a negative meniscus lens element whose high-curvature surface faces the image side; a bi-concave lens element having an aspherical surface, and a positive lens element whose high-curvature surface faces the object side. The third lens unit G3 comprises at least two lens elements including a third lens unit object side lens element which is a positive lens element disposed on the most object side and whose high-curvature surface faces the object side and a third lens unit image side lens element which is a negative lens element disposed on the most image side and concave in relation to the image side. In the zoom lens systems according to the first to fourth embodiments, since the above-described structure is provided, the number of lens elements included in each lens unit is small, so that the zoom lens systems can be made compact when not in use.

In particular, in the zoom lens systems according to the first to third embodiments, the third lens unit G3, in order from the object side to the image side, comprises: a positive lens element whose high-curvature surface faces the object side; a positive lens element; and a negative lens element. In the zoom lens systems according to the first to third embodiments, by thus constructing the third lens unit G3, sufficient aberration correction can be performed.

Moreover, in the zoom lens system according to the fourth embodiment, the third lens unit G3, in order from the object side to the image side, comprises: a positive lens element L6 whose high-curvature surface faces the object side; and a seventh lens element L7 which is a negative lens element. In the zoom lens system according to the fourth embodiment, by thus constructing the third lens unit G3, sufficient aberration correction can be performed. Moreover, in the zoom lens system according to the fourth embodiment, since the number of lens elements included in the third lens unit G3 is reduced compared to the zoom lens systems according to the first to third embodiments, the cause for the generation of decentering aberration at the time of assembly can be reduced, so that a zoom lens system whose assembly and adjustment are easy is realized.

Moreover, in the zoom lens systems according to the first to fourth embodiments, the fourth lens unit G4 comprises one positive lens element. In the zoom lens systems of the embodiments, the size when collapsed can be reduced by the above-described structure. Further, in the zoom lens systems of the embodiments, by moving the fourth lens unit G4 along the optical axis, focusing from the infinity in-focus condition to the near object in-focus condition can be performed.

Conditions to be satisfied by the zoom lens systems according to the embodiments will be described. While a plurality of conditions to be satisfied are defined for the zoom lens systems according to the embodiments, a zoom lens system construction that satisfies all the conditions is most preferable. However, by satisfying an individual condition, a zoom lens system producing the corresponding effect can be obtained.

It is preferable that the zoom lens systems of the embodiments satisfy the following conditions (1) and (2):

$$7.0 < L_W/f_W < 9.0 \tag{1}$$

$$1.5 < L_T/f_T < 2.1 \tag{2}$$

(here, $Z=f_T/f_W>5.0$.)

In these conditional expressions, $L_W$ is the optical overall length at the wide-angle limit, $f_W$ is the focal length of the entire lens system at the wide-angle limit, $L_T$ is the optical overall length at the telephoto limit, and $f_T$ is the focal length of the entire lens system at the telephoto limit.

The conditions (1) and (2) are conditions for reducing the optical overall length and ensuring an excellent imaging characteristic and magnification variation ratio. When the conditions (1) and (2) are not satisfied, it is difficult to reduce the optical overall length and ensure an excellent imaging characteristic and magnification variation ratio.

In the zoom lens systems of the embodiments, by defining the range of the condition (2) as that of the following condition (2)', a more remarkable effect can be produced:

$$1.7 < L_T/f_T < 2.1 \quad (2)'$$

(here, $Z = f_T/f_W > 5.0$.)

It is preferable that the zoom lens systems of the embodiments satisfy the following condition (3):

$$5.0 < f_{G1}/f_W < 8.0 \quad (3)$$

(here, $Z = f_T/f_W > 5.0$.)

In this conditional expression, $f_W$ is the focal length of the entire lens system at the wide-angle limit, $f_{G1}$ is the focal length of the first lens unit, and $f_T$ is the focal length of the entire lens system at the telephoto limit.

The condition (3) is a condition for reducing the diameter of the most object side lens element and the optical overall length. When the value of the condition exceeds the lower limit, the refractive power of the first lens unit increases, so that the diameter of the most object side lens element increases. When the value of the condition exceeds the upper limit, the refractive power of the first lens unit decreases, so that the magnification varying property of the second lens unit weakens and the optical overall length increases.

In the zoom lens systems of the embodiments, by defining the range of the condition (3) as that of the following condition (3)', the above-mentioned effect can be further produced and by defining it as the range of the following condition (3)", a more remarkable effect can be produced:

$$6.0 < f_{G1}/f_W < 8.0 \quad (3)'$$

$$7.0 < f_{G1}/f_W < 8.0 \quad (3)''$$

(here, $Z = f_T/f_W > 5.0$.)

It is preferable that the zoom lens systems of the embodiments satisfy the following condition (4):

$$2.0 < f_{G4}/f_W < 3.5 \quad (4)$$

(here, $Z = f_T/f_W > 5.0$.)

In this conditional expression, $f_W$ is the focal length of the entire lens system at the wide-angle limit, $f_{G4}$ is the focal length of the fourth lens unit, and $f_T$ is the focal length of the entire lens system at the telephoto limit.

The condition (4) is a condition for making telecentricity excellent and reducing field curvature. When the value of the condition exceeds the lower limit, although field curvature decreases, telecentricity is insufficient. On the other hand, when the value of the condition exceeds the upper limit, although telecentricity is excellent, the field curvature of the entire lens system cannot be sufficiently corrected.

In the zoom lens systems of the embodiments, by defining the range of the condition (4) as that of at least one of the following conditions (4)' and (4)", the above-mentioned effect can be further produced:

$$2.5 < f_{G4}/f_W \quad (4)'$$

$$f_{G4}/f_W < 2.9 \quad (4)''$$

(here, $Z = f_T/f_W > 5.0$.)

It is preferable that the zoom lens systems of the embodiments satisfy the following condition (5):

$$2.0 < f_{G3}/f_W < 3.0 \quad (5)$$

(here, $Z = f_T/f_W > 5.0$.)

In this conditional expression, $f_{G3}$ is the focal length of the third lens unit, $f_W$ is the focal length of the entire lens system at the wide-angle limit, and $f_T$ is the focal length of the entire lens system at the telephoto limit.

The condition (5) is a condition for reducing the optical overall length as much as possible and well-balancedly correcting the generation of aberrations. When the value of the condition exceeds the lower limit, the object-to-image distance of the third lens unit G3 increases, so that the optical overall length increases. On the other hand, when the value of the condition exceeds the upper limit, although the optical overall length decreases, it is difficult to secure a sufficient space to dispose a diaphragm between the first lens unit G1 and the second lens unit G2 at the telephoto limit.

In the zoom lens systems of the embodiments, by defining the range of the condition (5) as that of at least one of the following conditions (5)' and (5)", the above-mentioned effect can be further produced:

$$2.2 < f_{G3}/f_W \quad (5)'$$

$$f_{G3}/f_W < 2.5 \quad (5)''$$

(here, $Z = f_T/f_W > 5.0$.)

It is preferable that the zoom lens systems of the embodiments satisfy the following condition (6):

$$0.7 < r_F/f_W < 1.3 \quad (6)$$

(here, $Z = f_T/f_W > 5.0$.)

In this conditional expression, $r_F$ is the radius of curvature of the object side surface of the third lens unit most object side lens element, $f_W$ is the focal length of the entire lens system at the wide-angle limit, and $f_T$ is the focal length of the entire lens system at the telephoto limit.

The condition (6) is a condition for well-balancedly correcting the aberrations caused in the third lens unit G3 and reducing the optical overall length. When the value of the condition exceeds the lower limit, the optical overall length is long. On the other hand, when the value of the condition exceeds the upper limit, it is difficult to well-balancedly correct spherical aberration and coma aberration by another lens element.

In the zoom lens systems of the embodiments, by defining the range of the condition (6) as that of at least one of the following conditions (6)' and (6)", the above-mentioned effect can be further produced:

$$0.8 < r_F/f_W \quad (6)'$$

$$r_F/f_W < 1.1 \quad (6)''$$

(here, $Z = f_T/f_W > 5.0$.)

It is preferable that the zoom lens systems of the embodiments satisfy the following condition (7):

$$0.5 < r_R/f_W < 1.0 \quad (7)$$

(here, $Z = f_T/f_W > 5.0$.)

In this conditional expression, $r_R$ is the radius of curvature of the image side surface of the third lens unit most image side lens element, $f_W$ is the focal length of the entire lens system at the wide-angle limit, and $f_T$ is the focal length of the entire lens system at the telephoto limit.

The condition (7) is a condition for well-balancedly correcting the aberrations caused in the third lens unit G3. When the value of the condition exceeds the lower limit, field curvature and the negative distortion at the wide-angle limit cannot be suppressed to be small. On the other hand, when the value of the condition exceeds the upper limit, it is difficult to well-balancedly correct coma aberration and astigmatism by another lens element.

In the zoom lens systems of the embodiments, by defining the range of the condition (7) as that of at least one of the following conditions (7)' and (7)", the above-mentioned effect can be further produced:

$$0.7 < r_R/f_W \tag{7}'$$

$$r_R/f_W < 0.8 \tag{7}''$$

(here, $Z = f_T/f_W > 5.0$.)

It is preferable that the zoom lens systems of the embodiments satisfy the following condition (8):

$$20 < d_{si}/Z \times L_W/f_W < 30 \tag{8}$$

(here, $Z = f_T/f_W > 5.0$.)

In this conditional expression, when the thickness of the i-th lens unit (i is an integer) is $d_i$, $d_{si}$ is the sum total of the thicknesses of the lens units, Z is the magnification variation ratio at the wide-angle and telephoto limits when the shooting distance is ∞, $L_W$ is the optical overall length at the wide-angle limit, $f_W$ is the focal length of the entire lens system at the wide-angle limit, and $f_T$ is the focal length of the entire lens system at the telephoto limit.

The condition (8) relates to the thickness of the lens units. When the upper limit thereof is exceeded, it is difficult to reduce the overall size of the lens system; in particular, the overall length when collapsed cannot be reduced. On the other hand, when the lower limit is exceeded, the aberration correction in the entire zoom range is difficult.

To make the imaging characteristic more excellent, by defining the range of the condition (8) as that of at least one of the following conditions (8)' and (8)", the above-mentioned effect can be further produced:

$$22.5 < d_{si}/Z \times L_W/f_W \tag{8}'$$

$$d_{si}/Z \times L_W/f_W < 24.5 \tag{8}''$$

(here, $Z = f_T/f_W > 5.0$.)

In the zoom lens systems of the embodiments, it is preferable that the image blur caused by a vibration of the zoom lens system can be compensated for by moving the third lens unit in a direction perpendicular to the optical axis and the following condition (9) be satisfied:

$$1.1 < -(1-m_{G2T})m_{G3T}m_{G4T} < 2.5 \tag{9}$$

(here, $Z = f_T/f_W > 5.0$.)

In this conditional expression, $m_{G2T}$ is the magnification of the second lens unit at the telephoto limit when the shooting distance is ∞, $m_{G3T}$ is the magnification of the third lens unit at the telephoto limit when the shooting distance is ∞, $m_{G4T}$ is the magnification of the fourth lens unit at the telephoto limit when the shooting distance is ∞, $f_W$ is the focal length of the entire lens system at the wide-angle limit, and $f_T$ is the focal length of the entire lens system at the telephoto limit.

The condition (9) is a condition for making excellent the imaging characteristic at the time of image blur compensation. When $-(1-m_{G2T})m_{G3T}m_{G4T}$ exceeds the lower limit, since the decentering amount of the third lens unit necessary for decentering the image by a predetermined amount is too large, the change in aberrations due to the parallel movement of the third lens unit G3 increases, so that the imaging characteristic in the periphery of the image is degraded. On the other hand, when $-(1-m_{G2T})m_{G3T}m_{G4T}$ exceeds the upper limit, since the decentering amount of the third lens unit G3 necessary for decentering the image by a predetermined amount is too small, it is difficult to move the third lens unit G3 parallel with precision. Consequently, the pixel shift of the image during shooting cannot be made sufficiently small, so that it is difficult to make excellent the imaging characteristic at the time of image blur compensation.

To make the imaging characteristic more excellent, by defining the range of the condition (9) as that of at least one of the following conditions (9)' and (9)", the above-mentioned effect can be further produced:

$$1.7 < -(1-m_{G2T})m_{G3T}m_{G4T} \tag{9}'$$

$$-(1-m_{G2T})m_{G3T}m_{G4T} < 1.8 \tag{9}''$$

(here, $Z = f_T/f_W > 5.0$.)

It is preferable that the zoom lens systems of the embodiments satisfy the following condition (10):

$$1.5 < m_{G2T}/m_{G2W} < 3.0 \tag{10}$$

(here, $Z = f_T/f_W > 5.0$.)

In this conditional expression, $m_{G2T}$ is the magnification of the second lens unit at the telephoto limit when the shooting distance is ∞, $m_{G2W}$ is the magnification of the second lens unit at the wide-angle limit when the shooting distance is ∞, $f_W$ is the focal length of the entire lens system at the wide-angle limit, and $f_T$ is the focal length of the entire lens system at the telephoto limit.

The condition (10) is a condition for defining the magnification variation of the second lens unit and determining the amount of load of magnification variation on the second lens unit. When the lower limit of the condition (10) is exceeded, it is difficult to ensure the magnification variation ratio. On the other hand, when the upper limit of the condition (10) is exceeded, it is difficult to perform aberration correction in the entire zoom range while reducing the optical overall length.

In the zoom lens systems of the embodiments, by defining the range of the condition (10) as that of at least one of the following conditions (10)' and (10)", the above-mentioned effect can be further produced:

$$2.0 < m_{G2T}/m_{G2W} \tag{10}'$$

$$m_{G2T}/m_{G2W} < 2.5 \tag{10}''$$

(here, $Z = f_T/f_W > 5.0$.)

It is preferable that the zoom lens systems of the embodiments satisfy the following condition (11):

$$0.3 < \Delta m_{G2} < 0.7 \tag{11}$$

(here, $Z = f_T/f_W > 5.0$.)

In this conditional expression, $\Delta m_{G2}$ is the absolute value of the magnification variation amount of the second lens unit from the wide-angle limit to the telephoto limit when the shooting distance is ∞, $f_W$ is the focal length of the entire lens system at the wide-angle limit, and $f_T$ is the focal length of the entire lens system at the telephoto limit.

The condition (11) is a condition for defining the magnification variation of the second lens unit and determining the amount of load of magnification variation on the second lens unit. When the lower limit of the condition (11) is exceeded, it is difficult to ensure the magnification variation ratio. On the other hand, when the upper limit of the condition (11) is exceeded, it is difficult to perform aberration correction in the entire zoom range while reducing the optical overall length.

In the zoom lens systems of the embodiments, by defining the range of the condition (11) as that of at least one of the following conditions (11)' and (11)", the above-mentioned effect can be further produced:

$$0.4 < \Delta m_{G2} \quad (11)'$$

$$\Delta m_{G2} < 0.5 \quad (11)''$$

(here, $Z=f_T/f_W>5.0$.)

It is preferable that the zoom lens systems of the embodiments satisfy the following condition (12):

$$0.5 < \Delta m_{G3} < 1.8 \quad (12)$$

(here, $Z=f_T/f_W>5.0$.)

In this conditional expression, $\Delta m_{G3}$ is the absolute value of the amount of magnification variation of the third lens unit from the wide-angle limit to the telephoto limit when the shooting distance is ∞, $f_W$ is the focal length of the entire lens system at the wide-angle limit, and $f_T$ is the focal length of the entire lens system at the telephoto limit.

The condition (12) is a condition for defining the magnification variation of the third lens unit and determining the amount of load of magnification variation on the third lens unit. When the lower limit of the condition (12) is exceeded, it is difficult to excellently correct the coma aberration caused in the third lens unit. On the other hand, when the upper limit of the condition (12) is exceeded, the movement amount of the third lens unit is large, so that the F-number is large.

In the zoom lens systems of the embodiments, by defining the range of the condition (12) as that of at least one of the following conditions (12)' and (12)", the above-mentioned effect can be further produced:

$$0.8 < \Delta m_{G3} \quad (12)'$$

$$\Delta m_{G3} < 1.5 \quad (12)''$$

(here, $Z=f_T/f_W>5.0$.)

It is preferable that the zoom lens systems of the embodiments satisfy the following condition (13):

$$0.2 < \Delta m_{G2}/\Delta m_{G3} < 1.2 \quad (13)$$

(here, $Z=f_T/f_W>5.0$.)

In this conditional expression, $\Delta m_{G2}$ is the absolute value of the amount of magnification variation of the second lens unit from the wide-angle limit to the telephoto limit when the shooting distance is ∞, $\Delta m_{G3}$ is the absolute value of the magnification variation amount of the third lens unit from the wide-angle limit to the telephoto limit when the shooting distance is ∞, $f_W$ is the focal length of the entire lens system at the wide-angle limit, and $f_T$ is the focal length of the entire lens system at the telephoto limit.

The condition (13) is a condition for defining the magnification variation ratio between the second lens unit and the third lens unit and determining the amount of load of magnification variation on each lens unit. When the lower limit of the condition (13) is exceeded, it is difficult to perform aberration correction in the entire zoom range. On the other hand, when the upper limit of the condition (13) is exceeded, it is difficult to ensure the magnification variation ratio.

In the zoom lens systems of the embodiments, by defining the range of the condition (13) as that of at least one of the following conditions (13)' and (13)", the above-mentioned effect can be further produced:

$$0.3 < \Delta m_{G2}/\Delta m_{G3} \quad (13)'$$

$$\Delta m_{G2}/\Delta m_{G3} < 0.8 \quad (13)''$$

(here, $Z=f_T/f_W>5.0$.)

It is preferable that the zoom lens systems of the embodiments satisfy the following condition (14):

$$0 < M_{1WM}/M_{1MT} < 0.32 \quad (14)$$

(here, $Z=f_T/f_W>5.0$.)

In this conditional expression, $M_{1WM}$ is the amount of movement of the first lens unit from the wide-angle limit to the middle focal length condition when the shooting distance is ∞, $M_{1MT}$ is the amount of movement of the first lens unit from the middle focal length condition to the telephoto limit when the shooting distance is ∞, the middle focal length condition, $f_M=\sqrt{(f_W*f_T)}$, $f_M$ is defined by the focal length of the entire zoom lens system in the middle focal length condition, $f_W$ is the focal length of the entire lens system at the wide-angle limit, and $f_T$ is the focal length of the entire lens system at the telephoto limit.

The condition (14) relates to the movement locus of the first lens unit in magnification varying. When the lower limit of the condition (14) is exceeded, the optical overall length increases, so that it is difficult to reduce the overall size of the lens system. On the other hand, when the upper limit of the condition (14) is exceeded, the aberration variation in the entire zoom range increases, so that it is difficult to obtain excellent optical performance.

While the lens units included in the embodiments comprise only refractive type lens elements that deflect the incident light ray by refraction (that is, lens elements of a type in which the incident light ray is deflected at the interface between media having different refractive indices), the present invention is not limited thereto. For example, the lens units may comprise: diffractive type lens elements that deflect the incident light ray by diffraction; refractive-diffractive hybrid lens elements that deflect the incident light ray by a combination of diffraction and refraction, or gradient index lens elements that deflect the incident light ray by the distribution of refractive index in the medium.

Moreover, in the embodiments, the optical path may be bent in front of, behind or in the middle of the zoom lens system by disposing a reflecting surface on the optical path. The position of the bend is set as required. By appropriately bending the optical path, reduction in the apparent thickness of the camera can be achieved.

Further, while a plate including an optical low-pass filter disposed between the last surface of the zoom lens system and the image sensor is disposed in the embodiments, as the low-pass filter, for example, the following are applicable: a birefringent low-pass filter made of, for example, a crystal in which a predetermined crystal orientation is adjusted; and a phase low-pass filter that achieves a required optical cut-off frequency characteristic by a diffraction effect. Moreover, in the embodiments, the low-pass filter may be omitted in accordance with the characteristic of the solid-state image sensor that receives the optical image of the zoom lens system.

Fifth Embodiment

Figure 13:
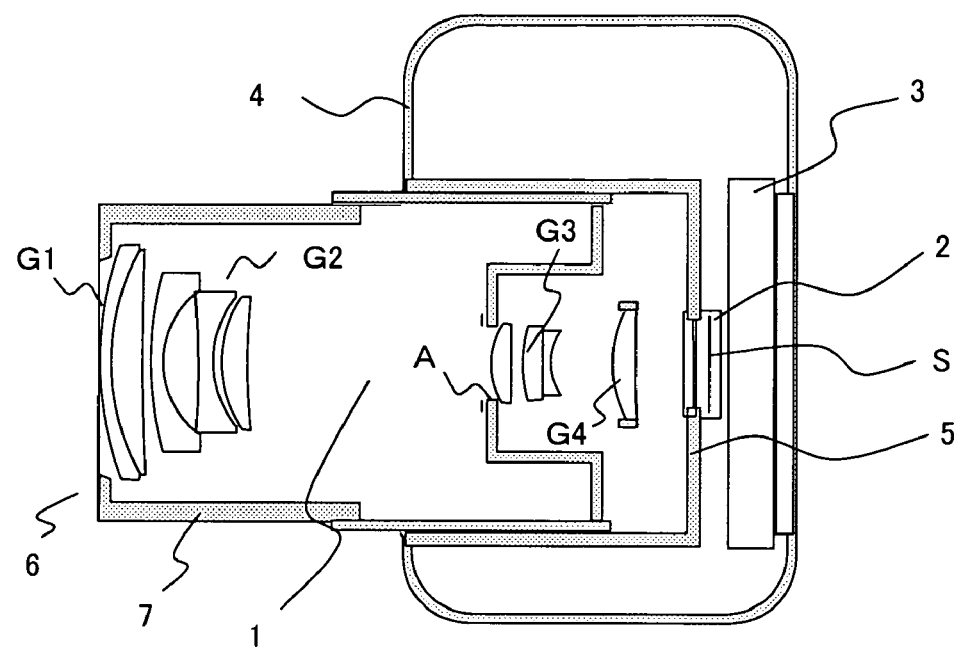
FIG. 13 is a cross-sectional view of the structure of a digital still camera according to a fifth embodiment.

FIG. 13 is a cross-sectional view of the structure of a digital still camera according to a fifth embodiment. In FIG. 13, the digital still camera comprises: an imaging device including a zoom lens system 1 and a solid-state image sensor 2 which is a CCD; a liquid crystal monitor 3; a body 4; and the like. As the zoom lens system 1, the zoom lens system according to the first embodiment is used. In FIG. 13, the zoom lens system 1 comprises the first lens unit G1, the second lens unit G2, the diaphragm A, the third lens unit G3 and the fourth lens unit G4. In the body 4, the zoom lens system 1 is disposed on the front side, and the solid-state image sensor 2 which is a CCD is disposed behind the zoom lens system 1. In the rear of the body 4, the liquid crystal monitor 3 is disposed. An optical image of the subject by the zoom lens system 1 is formed on the image surface S.

In the solid-state image sensor 2, the number of recording pixels is 2304 in the horizontal direction×1728 in the vertical direction (approximately four million pixels), the pixel pitch is 2.5 μm in the horizontal direction×2.5 μm in the vertical direction, the size of the recording image plane is 5.76 mm in the horizontal direction×4.32 mm in the vertical direction (the diagonal length 7.2 mm), and a positive microlens is provided at each pixel.

The lens barrel comprises a main barrel 5, a movable barrel 6 and a cylindrical cam 7. When the cylindrical cam 7 is rotated, the first lens unit G1, the second lens unit G2 and the third lens unit G3 are moved to a predetermined position relative to the solid-state image sensor 2, whereby magnification varying from the wide-angle limit to the telephoto limit can be performed. The fourth lens unit G4 can be moved in the direction of the optical axis by a motor for focus adjustment.

Thus, by using the zoom lens system of the first embodiment for a digital still camera, a digital still camera can be provided in which the magnification variation ratio is approximately 5 to 6×, the angle of view at the wide-angle limit is approximately 60 to 65°, resolution is high, and the depth when not in use is small. For the digital still camera shown in FIG. 13, any of the zoom lens systems of the second to fourth embodiments may be used instead of the zoom lens system of the first embodiment.

Moreover, an imaging device comprising any of the above-described zoom lens systems of the first to fourth embodiments and an image sensor such as a CCD or a CMOS may be applied to mobile telephones, PDAs (personal digital assistances), surveillance cameras in surveillance systems, web cameras, vehicle-mounted cameras and the like.

Moreover, when an image blur compensation function is provided in the above-described digital still camera, a mechanism that moves the third lens unit G3 in a direction perpendicular to the optical axis, an image blur compensation motor and the like are added, and the image blur compensation motor is controlled by an image blur compensation signal. For the generation of the image blur compensation signal, known methods may be used such as a method in which the signal is generated from the detection result of the vibration of the digital still camera detected by a known angular velocity sensor or a method in which the signal is generated by image processing from an image signal formed by the solid-state image sensor.

Further, in the above-described digital still camera, an digital zoom function may be provided that enlarges the image formed in a central part of the solid-state image sensor, to the entire area of the image plane by a signal processing circuit. When the digital zoom function is used, the effect produced by the blur compensation function is remarkably obtained as described below.

The degree of blur when the zoom lens system is inclined due to an image blur can be evaluated by use of the ratio of the image decentering amount to the diagonal length of the solid-state image sensor (image decentering amount ratio). This ratio is fixed irrespective of the size in which the image is printed from the signal of the shot image. While the diagonal length of the shot image when the digital zoom function is not used coincides with that of the effective area of the solid-state image sensor, the diagonal length of the shot image when the digital zoom function is used is smaller than that of the solid-state image sensor. Therefore, when the image decentering amount is fixed, the use of the digital zoom function increases the image decentering amount ratio, which increases the degree of blur.

When the image blur compensation function is used, since the image decentering amount is extremely small, even if the digital zoom function is used, the image decentering amount ratio is low, so that the image blur is significantly improved.

In the digital still camera shown in FIG. 13, even when the parallel movement amount of the third lens unit is the same, there are cases where a difference is caused in the imaging characteristic according to the direction of the third lens unit. In this case, the difference in the imaging characteristic can be reduced by adjusting the inclination of the solid-state image sensor.

Moreover, for the digital still camera shown in FIG. 13, as the solid-state image sensor, a solid-state image sensor in which the number of recording pixels is 2560 in the horizontal direction×1920 in the vertical direction (approximately five million pixels), the pixel pitch is 2.2 μm in the horizontal direction×2.2 μm in the vertical direction, the size of the recording image plane is 5.632 mm in the horizontal direction×4.224 mm in the vertical direction (the diagonal length 7.04 mm) may be used instead of the above-described solid-state image sensor of four million pixels.

Moreover, the structure of the digital still camera shown in FIG. 13 may be used for digital video cameras intended for moving images. In this case, not only still images but also moving images with high resolution can be taken.

EXAMPLES

Hereinafter, numerical examples which are concrete implementations of the zoom lens systems according to the first to fourth embodiments will be described. In the numerical examples, the units of the length in the tables are all mm. Moreover, in the numerical examples, r is the radius of curvature, d is the axial distance, nd is the refractive index to the d-line, and νd is the Abbe number. In the numerical examples, the surfaces marked with * are aspherical surfaces, and the aspherical surface configuration is defined by the following expression:

$$Z = \frac{h^2/r}{1 + \sqrt{1-(1+\kappa)(h/r)^2}} + Dh^4 + Eh^6 + Fh^8 + Gh^{10} + Hh^{12} + Ih^{14} + Jh^{16}$$

Here, κ is the conic constant, D, E, F, G, H, I and J are a fourth-order, sixth-order, eighth-order, tenth-order, twelfth-order, fourteenth-order and sixteenth-order aspherical coefficients, respectively.

First Example

A zoom lens system of a first example corresponds to the first embodiment shown in FIGS. 1A to 1C. The lens data of the zoom lens system of the first example is shown in Table 1, the focal length, the F-number, the angle of view, the optical overall length and the variable axial distance data, when the shooting distance is ∞, are shown in Table 2, and the aspherical data is shown in Table 3.

TABLE 1

| Lens unit | Lens | Surface | r | | d | nd | νd |
|---|---|---|---|---|---|---|---|
| G1 | L1 | 1 | 28.591 | | 0.800 | 1.846660 | 23.78 |
| | L2 | 2 | 19.732 | | 2.700 | 1.772500 | 49.65 |
| | | 3 | 186.014 | | Variable | | |
| G2 | L3 | 4 | 30.265 | | 1.000 | 1.806100 | 33.27 |
| | | 5 | 7.881 | | 2.935 | | |
| | L4 | 6 | −98.093 | * | 1.100 | 1.665470 | 55.18 |
| | | 7 | 8.517 | * | 0.720 | | |
| | L5 | 8 | 10.136 | | 2.000 | 1.846660 | 23.78 |
| | | 9 | 51.123 | | Variable | | |
| Diaphragm | | 10 | ∞ | | 0.810 | | |
| G3 | L6 | 11 | 6.485 | | 1.620 | 1.696800 | 55.48 |
| | | 12 | 452.791 | | 1.046 | | |
| | L7 | 13 | 9.073 | * | 1.710 | 1.665470 | 55.18 |
| | L8 | 14 | −203.752 | | 0.630 | 1.805180 | 25.46 |
| | | 15 | 4.878 | | Variable | | |
| G4 | L9 | 16 | 10.677 | | 1.935 | 1.743300 | 49.23 |
| | | 17 | 89.181 | | Variable | | |
| P | | 18 | ∞ | | 0.900 | 1.516800 | 64.20 |
| | | 19 | ∞ | | | | |

TABLE 2

| Axial Distance | Wide-angle limit | Middle position | Telephoto limit |
|---|---|---|---|
| f | 6.34 | 15.49 | 36.82 |
| F | 2.87 | 3.46 | 4.88 |
| 2ω | 61.1 | 26.2 | 11.0 |
| L | 50.503 | 53.371 | 63.287 |
| d3 | 0.700 | 11.151 | 18.059 |
| d9 | 19.619 | 7.391 | 1.300 |
| d15 | 5.149 | 8.458 | 19.026 |
| d17 | 4.025 | 5.366 | 3.906 |

TABLE 3

| Surface | κ | D | E |
|---|---|---|---|
| 6 | 0.00000E+00 | −4.47190E−04 | 1.76015E−05 |
| 7 | 0.00000E+00 | −5.11326E−04 | 1.95818E−05 |
| 13 | 0.00000E+00 | −7.06626E−04 | −2.25760E−05 |

| Surface | F | G |
|---|---|---|
| 6 | −2.59332E−07 | 1.23080E−09 |
| 7 | −2.67476E−07 | 2.15864E−10 |
| 13 | −9.09153E−07 | 4.13444E−08 |

Second Example

A zoom lens system of a second example corresponds to the second embodiment shown in FIGS. 3A to 3C. The lens data of the zoom lens system of the second example is shown in Table 4, the focal length, the F-number, the angle of view, the optical overall length and the variable axial distance data, when the shooting distance is ∞, are shown in Table 5, and the aspherical data is shown in Table 6.

TABLE 4

| Lens unit | Lens | Surface | r | | d | nd | νd |
|---|---|---|---|---|---|---|---|
| G1 | L1 | 1 | 26.815 | | 2.500 | 1.696800 | 55.48 |
| | | 2 | −261.094 | | Variable | | |
| G2 | L2 | 3 | 95.152 | | 0.900 | 1.806100 | 33.27 |
| | | 4 | 8.188 | | 2.704 | | |
| | L3 | 5 | −320.778 | * | 1.100 | 1.606020 | 57.44 |
| | | 6 | 8.503 | * | 0.720 | | |
| | L4 | 7 | 10.583 | | 2.000 | 1.846660 | 23.78 |
| | | 8 | 49.402 | | Variable | | |
| Diaphragm | | 9 | ∞ | | 0.810 | | |
| G3 | L5 | 10 | 6.633 | | 1.620 | 1.696800 | 55.48 |
| | | 11 | ∞ | | 0.875 | | |
| | L6 | 12 | 9.180 | * | 1.710 | 1.665470 | 55.18 |
| | L7 | 13 | −1348.198 | | 0.540 | 1.805180 | 25.46 |
| | | 14 | 4.957 | | Variable | | |
| G4 | L8 | 15 | 11.676 | | 1.935 | 1.806100 | 40.73 |
| | | 16 | 108.410 | | Variable | | |
| P | | 17 | ∞ | | 0.900 | 1.516800 | 64.20 |
| | | 18 | ∞ | | | | |

TABLE 5

| Axial distance | Wide-angle limit | Middle position | Telephoto limit |
|---|---|---|---|
| f | 6.24 | 15.27 | 36.16 |
| F | 2.88 | 3.83 | 6.06 |
| 2ω | 62.5 | 26.4 | 11.3 |
| L | 50.540 | 51.517 | 64.857 |
| d2 | 0.700 | 6.421 | 9.988 |
| d8 | 20.187 | 7.561 | 1.300 |
| d14 | 5.915 | 12.922 | 29.736 |
| d16 | 4.320 | 5.211 | 4.434 |

TABLE 6

| Surface | κ | D | E |
|---|---|---|---|
| 5 | 0.00000E+00 | −5.30261E−04 | 1.79179E−05 |
| 6 | 0.00000E+00 | −6.46217E−04 | 2.15716E−05 |
| 12 | 0.00000E+00 | −6.20192E−04 | −1.83542E−05 |

| Surface | F | G |
|---|---|---|
| 5 | −2.89278E−07 | 1.89017E−09 |
| 6 | −4.03219E−07 | 2.95978E−09 |
| 12 | −5.66499E−07 | 1.47856E−08 |

Third Example

A zoom lens system of a third example corresponds to the third embodiment shown in FIGS. 5A to 5C. The lens data of the zoom lens system of the third example is shown in Table 7, the focal length, the F-number, the angle of view, the optical overall length and the variable axial distance data, when the shooting distance is ∞, are shown in Table 8, and the aspherical data is shown in Table 9.

TABLE 7

| Lens unit | Lens | Surface | r | d | nd | νd |
|---|---|---|---|---|---|---|
| G1 | L1 | 1 | 26.272 | 2.650 | 1.589130 | 61.24 |
| | | 2 | 265.286 | Variable | | |
| G2 | L2 | 3 | 22.422 | 1.000 | 1.806100 | 33.27 |
| | | 4 | 8.291 | 2.975 | | |

TABLE 7-continued

| Lens unit | Lens | Surface | r | | d | nd | νd |
|---|---|---|---|---|---|---|---|
| | L3 | 5 | −106.709 | * | 1.100 | 1.665470 | 55.18 |
| | | 6 | 8.615 | * | 0.720 | | |
| | L4 | 7 | 8.956 | | 2.000 | 1.846660 | 23.78 |
| | | 8 | 21.731 | | Variable | | |
| Diaphragm | | 9 | ∞ | | 0.810 | | |
| G3 | L5 | 10 | 6.353 | | 1.620 | 1.696800 | 55.48 |
| | | 11 | 204.179 | | 1.056 | | |
| | L6 | 12 | 8.249 | * | 1.710 | 1.665470 | 55.18 |
| | L7 | 13 | −114.594 | | 0.630 | 1.846660 | 23.78 |
| | | 14 | 4.824 | | Variable | | |
| G4 | L8 | 15 | 13.117 | | 1.850 | 1.846660 | 23.78 |
| | | 16 | 133.708 | | Variable | | |
| P | | 17 | ∞ | | 0.900 | 1.516800 | 64.20 |
| | | 18 | ∞ | | | | |

TABLE 8

| Axial distance | Wide-angle limit | Middle position | Telephoto limit |
|---|---|---|---|
| f | 6.27 | 15.51 | 35.75 |
| F | 2.88 | 3.46 | 4.63 |
| 2ω | 62.3 | 26.1 | 11.5 |
| L | 49.831 | 49.838 | 63.398 |
| d2 | 0.700 | 10.610 | 19.513 |
| d8 | 20.455 | 6.458 | 1.300 |
| d14 | 4.043 | 5.439 | 16.210 |
| d16 | 4.516 | 7.208 | 6.278 |

TABLE 9

| Surface | κ | D | E |
|---|---|---|---|
| 5 | 0.00000E+00 | −3.83568E−04 | 1.83304E−05 |
| 6 | 0.00000E+00 | −3.03719E−04 | 1.89967E−05 |
| 12 | 0.00000E+00 | −7.36461E−04 | −3.05869E−05 |

| Surface | F | G |
|---|---|---|
| 5 | −3.13805E−07 | 1.98261E−09 |
| 6 | −1.77718E−07 | −4.73229E−10 |
| 12 | 5.66695E−07 | −1.07953E−07 |

Fourth Example

A zoom lens system of a fourth example corresponds to the fourth embodiment shown in FIGS. 7A to 7C. The lens data of the zoom lens system of the fourth example is shown in Table 10, the focal length, the F-number, the angle of view, the optical overall length and the variable axial distance data, when the shooting distance is ∞, are shown in Table 11, and the aspherical data is shown in Table 12.

TABLE 10

| Lens unit | Lens | Surface | r | | d | nd | νd |
|---|---|---|---|---|---|---|---|
| G1 | L1 | 1 | 25.160 | | 0.800 | 1.846660 | 23.78 |
| | L2 | 2 | 18.400 | | 2.700 | 1.772500 | 49.65 |
| | | 3 | 140.100 | | Variable | | |
| G2 | L3 | 4 | 40.693 | | 1.000 | 1.834000 | 37.35 |
| | | 5 | 8.018 | | 3.250 | | |
| | L4 | 6 | −65.381 | * | 1.200 | 1.606020 | 57.44 |
| | | 7 | 8.532 | * | 0.800 | | |

TABLE 10-continued

| Lens unit | Lens | Surface | r | | d | nd | νd |
|---|---|---|---|---|---|---|---|
| | L5 | 8 | 11.854 | | 2.000 | 1.805180 | 25.46 |
| | | 9 | −1327.469 | | Variable | | |
| Diaphragm | | 10 | ∞ | | 0.900 | | |
| G3 | L6 | 11 | 4.669 | * | 2.035 | 1.665470 | 55.18 |
| | | 12 | 486.933 | | 0.200 | | |
| | L7 | 13 | 7.866 | | 0.600 | 1.846660 | 23.78 |
| | | 14 | 3.673 | | Variable | | |
| G4 | L8 | 15 | 12.910 | | 1.935 | 1.743300 | 49.23 |
| | | 16 | 134.320 | | Variable | | |
| P | | 17 | ∞ | | 0.900 | 1.516800 | 64.20 |
| | | 18 | ∞ | | | | |

TABLE 11

| Axial distance | Wide-angle limit | Middle position | Telephoto limit |
|---|---|---|---|
| f | 6.34 | 15.50 | 36.82 |
| F | 2.90 | 3.45 | 5.06 |
| 2ω | 61.2 | 26.0 | 11.0 |
| L | 50.533 | 53.399 | 63.425 |
| d3 | 0.700 | 10.671 | 16.178 |
| d9 | 19.585 | 7.511 | 1.300 |
| d14 | 3.996 | 8.293 | 22.120 |
| d16 | 6.817 | 7.479 | 4.348 |

TABLE 12

| Surface | κ | D | E |
|---|---|---|---|
| 6 | 0.00000E+00 | −6.07977E−04 | 2.25294E−05 |
| 7 | 0.00000E+00 | −7.82394E−04 | 2.50059E−05 |
| 11 | 0.00000E+00 | −7.40167E−04 | −2.50692E−05 |

| Surface | F | G |
|---|---|---|
| 6 | −4.18253E−07 | 3.40728E−09 |
| 7 | −5.20510E−07 | 4.17755E−09 |
| 11 | −5.46704E−07 | −5.52918E−08 |

The corresponding values of the conditions in the first to fourth examples are shown in Table 13 shown below.

TABLE 13

| | Example | | | |
|---|---|---|---|---|
| Condition | 1 | 2 | 3 | 4 |
| $L_W/f_W$ | 7.97 | 8.10 | 7.95 | 7.97 |
| $L_T/f_T$ | 1.72 | 1.79 | 1.77 | 1.72 |
| $f_{G1}/f_W$ | 7.18 | 5.61 | 7.86 | 6.44 |
| $f_{G4}/f_W$ | 2.55 | 2.58 | 2.72 | 3.01 |
| $f_{G3}/f_W$ | 2.23 | 2.37 | 2.21 | 2.61 |
| $r_F/f_W$ | 1.02 | 1.06 | 1.01 | 0.74 |
| $r_R/f_W$ | 0.77 | 0.79 | 0.77 | 0.58 |
| $d_{si}/Z \times L_W/f_W$ | 24.96 | 23.21 | 24.13 | 22.67 |
| $-(1 - m_{G2T})m_{G3T} m_{G4T}$ | 1.74 | 2.29 | 1.67 | 1.72 |
| $m_{G2T}/m_{G2W}$ | 2.34 | 1.73 | 2.27 | 2.49 |
| $\Delta m_{G2}$ | 0.50 | 0.34 | 0.43 | 0.66 |
| $\Delta m_{G3}$ | 0.95 | 1.63 | 1.35 | 0.61 |
| $\Delta m_{G2}/\Delta m_{G3}$ | 0.52 | 0.21 | 0.32 | 1.09 |
| $M_{1WM}/M_{1MT}$ | 0.29 | 0.07 | 0.00 | 0.29 |

FIGS. 2A to 2I are graphic representations of longitudinal aberrations of the zoom lens system according to the first example. FIGS. 4A to 4I are graphic representations of longitudinal aberrations of the zoom lens system according to the second example. FIGS. 6A to 6I are graphic representations of longitudinal aberrations of the zoom lens system according to the third example. FIGS. 8A to 8I are graphic representations of longitudinal aberrations of the zoom lens system according to the fourth example.

FIGS. 2A to 2C, 4A to 4C, 6A to 6C and 8A to 8C show aberrations at the wide-angle limit. FIGS. 2D to 2F, 4D to 4F, 6D to 6F and 8D to 8F show aberrations at the middle position. FIGS. 2G to 2I, 4G to 4I, 6G to 6I and 8G to 8I show aberrations at the telephoto limit. FIGS. 2A, 2D, 2G, 4A, 4D, 4G, 6A, 6D, 6G, 8A, 8D and 8G show spherical aberration. FIGS. 2B, 2E, 2H, 4B, 4E, 4H, 6B, 6E, 6H, 8B, 8E, and 8H show astigmatism. FIGS. 2C, 2F, 2I, 4C, 4F, 4I, 6C, 6F, 6I, 8C, 8F and 8I show distortion. In the graphic representations of spherical aberration, the vertical axis represents the F-number, the solid line represents the characteristic to the d-line, the short dash line represents the characteristic to the F-line, and the long dash line represents the characteristic to the C-line. In the graphic representations of astigmatism, the vertical axis represents the half view angle, the solid line represents the characteristic on the sagittal image plane, and the dash line represents the characteristic on the meridional image plane. In the graphic representations of distortion, the vertical axis represents the half view angle.

FIGS. 9A to 9F are graphic representations of lateral aberrations of the zoom lens system according to the first example at the telephoto limit. FIGS. 10A to 10F are graphic representations of lateral aberrations of the zoom lens system according to the second example at the telephoto limit. FIGS. 11A to 11F are graphic representations of lateral aberrations of the zoom lens system according to the third example at the telephoto limit. FIGS. 12A to 12F are graphic representations of lateral aberrations of the zoom lens system according to the fourth example at the telephoto limit.

FIGS. 9A to 9C, 10A to 10C, 11A to 11c and 12A to 12C correspond to a basic condition at the telephoto limit in which no image blur compensation is performed. FIGS. 9D to 9F, 10D to 10F, 11D to 11F and 12D to 12F correspond to an image blur compensated condition at the telephoto limit in which the entire second lens unit G2 is moved by a predetermined amount in a direction vertical to the optical axis. Of the graphic representations of lateral aberrations corresponding to the basic condition, FIGS. 9A, 10A, 11A and 12A correspond to the lateral aberrations at the image point at 75% of the maximum image height, FIGS. 9B, 10B, 11B and 12B correspond to the lateral aberrations at the axial image point, and FIGS. 9C, 10C, 11C and 12C correspond to the lateral aberrations at the image point at −75% of the maximum image height. Of the graphic representations of lateral aberrations corresponding to the image blur compensated condition, FIGS. 9D, 10D, 11D and 12D correspond to the lateral aberrations at the image point at 75% of the maximum image height, FIGS. 9E, 10E, 11E and 12E correspond to the lateral aberrations at the axial image point, and FIGS. 9F, 10F, 11F and 12F correspond to the lateral aberrations at the image point at −75% of the maximum image height. In the graphic representations of lateral aberrations, the meridional image plane is a plane including the optical axis of the first lens unit G1 and the optical axis of the second lens unit G2.

The movement amount of the third lens unit G3 in a direction perpendicular to the optical axis in the image blur compensated condition is 0.129 mm in the first example, 0.105 mm in the second example, 0.132 mm in the third example and 0.135 mm in the fourth example. The image decentering amount at the telephoto limit when the shooting distance is ∞ in a case where the zoom lens system is inclined 0.3° is equal to the image decentering amount when the entire lens unit G3 is parallely moved by the above-mentioned values in the direction perpendicular to the optical axis.

As is apparent from the graphic representations of lateral aberrations, the symmetry of the lateral aberrations at the axial image point is excellent. Moreover, comparing the lateral aberrations at the image point at +75% with the lateral aberrations at the image point at −75% in the basic condition, since the degrees of curvature of both are low and the inclinations of the aberration curves are substantially the same, decentering coma aberration and decentering astigmatism are small. This means that sufficient imaging performance is obtained even in the image blur compensated condition. When the image blur compensation angle of the zoom lens system is the same, the shorter the overall focal length of the lens system is, the smaller the parallel movement amount necessary for image blur compensation is. Therefore, at any zoom position, for the image blur compensation angles up to 0.3°, sufficient image blur compensation can be performed without any degradation in imaging characteristic.

The above-described zoom lens systems are applicable to digital input apparatuses such as digital still cameras, digital video cameras, mobile telephones, PDAs (personal digital assistances), surveillance cameras in surveillance systems, web cameras and vehicle-mounted cameras, and particularly, suitable for use as taking optical systems which requir high image quality, such as digital still cameras and digital video cameras.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising:
    a first lens unit having positive optical power;
    a second lens unit having negative optical power;
    a third lens unit having positive optical power; and
    a fourth lens unit having positive optical power, collectively referred to as lens units,
    wherein,
    magnification varying is performed by varying distances along an optical axis between at least any two of the lens units,
    during magnification varying from a wide-angle limit to a telephoto limit, the third lens unit moves to the object side, and the first and second lens units move with locus of a convex to the image side,
    the third lens unit comprises at least two lens elements including a third lens unit object side lens element which is a positive lens element disposed at a position closest to the object side and whose high-curvature surface faces the object side and a third lens unit image side lens element which is a negative lens element disposed at a position closest to the image side and concave in relation to the image side, and
    the following conditions are satisfied:

$$7.0 < L_W/f_W < 9.0 \qquad (1)$$

$$1.5 < L_T/f_T < 2.1 \qquad (2)$$

(here, $Z = f_T/f_W > 5.0$)

where $L_W$ is an optical overall length at a wide-angle limit, $f_W$ is a focal length of an entire lens system at the wide-angle limit, $L_T$ is an optical overall length at a telephoto limit, and $f_T$ is a focal length of the entire lens system at the telephoto limit Z is a magnification variation ratio at the wide-angle and telephoto limits.

2. The zoom lens system as claimed in claim 1, wherein the following condition is satisfied:

$$1.7 < L_T/f_T < 2.1 \quad (2)'$$

(here, $Z=f_T/f_W>5.0$)
where $L_T$ is an optical overall length at a telephoto limit, $f_W$ is the focal length of an entire lens system at the wide-angle limit, and $f_T$ is the focal length of the entire lens system at the telephoto limit.

3. The zoom lens system as claimed in claim 1, wherein the third lens unit, in order from the object side to the image side, comprises: a positive lens element whose high-curvature surface faces the object side; a positive lens element; and a negative lens element concave to the image side.

4. The zoom lens system as claimed in claim 1, wherein the third lens unit, in order from the object side to the image side, comprises: a positive lens element whose high-curvature surface faces the object side; and a negative lens element concave to the image side.

5. The zoom lens system as claimed in claim 1, wherein the following condition is satisfied:

$$5.0 < f_{G1}/f_W < 8.0 \quad (3)$$

(here, $Z=f_T/f_W>5.0$)
where $f_{G1}$ is a focal length of the first lens unit, $f_W$ is the focal length of the entire lens system at the wide-angle limit, and $f_T$ is the focal length of the entire lens system at the telephoto limit.

6. The zoom lens system as claimed in claim 1, wherein the following condition is satisfied:

$$2.0 < f_{G4}/f_W < 3.5 \quad (4)$$

(here, $Z=f_T/f_W>5.0$)
where $f_{G4}$ is a focal length of the fourth lens unit, $f_W$ is the focal length of the entire lens system at the wide-angle limit, and $f_T$ is the focal length of the entire lens system at the telephoto limit.

7. The zoom lens system as claimed in claim 1, wherein the following condition is satisfied:

$$2.0 < f_{G3}/f_W < 3.0 \quad (5)$$

(here, $Z=f_T/f_W>5.0$)
where $f_{G3}$ is a focal length of the third lens unit, $f_W$ is the focal length of the entire lens system at the wide-angle limit, and $f_T$ is the focal length of the entire lens system at the telephoto limit.

8. The zoom lens system as claimed in claim 1, wherein the following condition is satisfied:

$$0.7 < r_F/f_W < 1.3 \quad (6)$$

(here, $Z=f_T/f_W>5.0$)
where $r_F$ is a radius of curvature of an object side surface of the third lens unit most object side lens element, $f_W$ is the focal length of the entire lens system at the wide-angle limit, and $f_T$ is the focal length of the entire lens system at the telephoto limit.

9. The zoom lens system as claimed in claim 1, wherein the following condition is satisfied:

$$0.5 < r_R/f_W < 1.0 \quad (7)$$

(here, $Z=f_T/f_W>5.0$)
where $r_R$ is a radius of curvature of an image side surface of the third lens unit most image side lens element, $f_W$ is the focal length of the entire lens system at the wide-angle limit, and $f_T$ is the focal length of the entire lens system at the telephoto limit.

10. The zoom lens system as claimed in claim 1, wherein the following condition is satisfied:

$$20 < d_{si}/Z \times L_W/f_W < 30 \quad (8)$$

(here, $Z=f_T/f_W>5.0$)
where when a thickness of an i-th lens unit (i is an integer) is $d_i$, $d_{si}$ is a sum total of the thicknesses of the lens units, Z is a magnification variation ratio at the wide-angle and telephoto limits when a shooting distance is ∞, $L_W$ is the optical overall length at the wide-angle limit, $f_W$ is the focal length of the entire lens system at the wide-angle limit, and $f_T$ is the focal length of the entire lens system at the telephoto limit.

11. The zoom lens system as claimed in claim 1, wherein an image side surface of the most object side positive lens element of the third lens unit is a plane or a concave surface.

12. The zoom lens system as claimed in claim 1, wherein an image blur caused by a vibration of the zoom lens system is compensatable by moving the third lens unit in a direction perpendicular to an optical axis, and the following condition is satisfied:

$$1.1 < -(1-m_{G2T})m_{G3T}m_{G4T} < 2.5 \quad (9)$$

(here, $Z=f_T/f_W>5.0$)
where $m_{G2T}$ is a magnification of the second lens unit at the telephoto limit when a shooting distance is ∞, $m_{G3T}$ is a magnification of the third lens unit at the telephoto limit when the shooting distance is ∞, $m_{G4T}$ is a magnification of the fourth lens unit at the telephoto limit when the shooting distance is ∞, $f_W$ is the focal length of an entire lens system at the wide-angle limit, and $f_T$ is the focal length of the entire lens system at the telephoto limit.

13. The zoom lens system as claimed in claim 1, wherein the following condition is satisfied:

$$1.5 < m_{G2T}/m_{G2W} < 3.0 \quad (10)$$

(here, $Z=f_T/f_W>5.0$)
where $m_{G2T}$ is a magnification of the second lens unit at the telephoto limit when a shooting distance is ∞, $m_{G2W}$ is a magnification of the second lens unit at the wide-angle limit when the shooting distance is ∞, $f_W$ is the focal length of an entire lens system at the wide-angle limit, and $f_T$ is the focal length of the entire lens system at the telephoto limit.

14. The zoom lens system as claimed in claim 1, wherein the following is satisfied:

$$0.3 < \Delta m_{G2} < 0.7 \quad (11)$$

(here, $Z=f_T/f_W>5.0$)
where $\Delta m_{G2}$ is an absolute value of an amount of magnification variation of the second lens unit from the wide-angle limit to the telephoto limit when a shooting distance is ∞, $f_W$ is the focal length of an entire lens system at the wide-angle limit, and $f_T$ is the focal length of the entire lens system at the telephoto limit.

15. The zoom lens system as claimed in claim 1, wherein the following condition is satisfied:

$$0.5 < \Delta m_{G3} < 1.8 \quad (12)$$

(here, $Z=f_T/f_W>5.0$)
where $\Delta m_{G3}$ is an absolute value of an amount of magnification variation of the third lens unit from the wide-angle limit to the telephoto limit when a shooting distance is ∞, $f_W$ is the focal length of an entire lens system at the wide-angle limit, and $f_T$ is the focal length of the entire lens system at the telephoto limit.

16. The zoom lens system as claimed in claim 1, wherein the following condition is satisfied:

$$0.2 < \Delta m_{G2}/\Delta m_{G3} < 1.2 \tag{13}$$

(here, $Z = f_T/f_W > 5.0$)

where $\Delta m_{G2}$ is an absolute value of an amount of magnification variation of the second lens unit from the wide-angle limit to the telephoto limit when a shooting distance is ∞, $\Delta m_{G3}$ is an absolute value of an amount of magnification variation of the third lens unit from the wide-angle limit to the telephoto limit when the shooting distance is ∞, $f_W$ is the focal length of an entire lens system at the wide-angle limit, and $f_T$ is the focal length of the entire lens system at the telephoto limit.

17. The zoom lens system as claimed in claim 1, wherein the following condition is satisfied:

$$0 < M_{1WM}/M_{1MT} < 0.32 \tag{14}$$

(here, $Z = f_T/f_W > 5.0$)

where $M_{1WM}$ is an amount of movement of the first lens unit from the wide-angle limit to a middle focal length condition when a shooting distance is ∞, $M_{1MT}$ is an amount of movement of the first lens unit from the middle focal length condition to the telephoto limit when the shooting distance is ∞, the middle focal length condition, $f_M = \sqrt{(f_W * f_T)}$, $f_M$ is defined by the focal length of the entire zoom lens system in the middle focal length condition, $f_W$ is the focal length of an entire lens system at the wide-angle limit, and $f_T$ is the focal length of the entire lens system at the telephoto limit.

18. An imaging device comprising:

a zoom lens system that forms an optical image of a subject so that a magnification is variable;

an image sensor that converts the optical image of the subject formed by the zoom lens system, into an electric signal;

wherein, the zoom lens system, in order from an object side to an image side, comprises:

a first lens unit having positive optical power;

a second lens unit having negative optical power;

a third lens unit having positive optical power; and a fourth lens unit having positive optical power, collectively referred to as lens units, wherein, magnification varying is performed by varying distances along an optical axis between at least any two of the lens units, during magnification varying from a wide-angle limit to a telephoto limit, the third lens unit moves to the object side, and the first and second lens units move with locus of a convex to the image side, the third lens unit comprises at least two lens elements including a third lens unit object side lens element which is a positive lens element disposed at a position closest to the object side and whose high-curvature surface faces the object side and a third lens unit image side lens element which is a negative lens element disposed at a position closest to the image side and concave in relation to the image side, and the following conditions are satisfied:

$$7.0 < L_W/f_W < 9.0 \tag{1}$$

$$1.5 < L_T/f_T < 2.1 \tag{2}$$

(here, $Z = f_T/f_W > 5.0$)

where $L_W$ is an optical overall length at a wide-angle limit, $f_W$ is a focal length of an entire lens system at the wide-angle limit, $L_T$ is an optical overall length at a telephoto limit, and $f_T$ is a focal length of the entire lens system at the telephoto limit Z is a magnification variation ratio at the wide-angle and telephoto limits.

19. A camera comprising:

an imaging device including a zoom lens system and an image sensor;

the zoom lens system forming an optical image of a subject so that a magnification is variable;

the image sensor converting the optical image of the subject formed by the zoom lens system, into an electric signal, wherein, the zoom lens system, in order from an object side to an image side, comprises:

a first lens unit having positive optical power;

a second lens unit having negative optical power;

a third lens unit having positive optical power; and a fourth lens unit having positive optical power, collectively referred to as lens units, wherein, magnification varying is performed by varying distances along an optical axis between at least any two of the lens units, during magnification varying from a wide-angle limit to a telephoto limit, the third lens unit moves to the object side, and the first and second lens units move with locus of a convex to the image side, the third lens unit comprises at least two lens elements including a third lens unit object side lens element which is a positive lens element disposed at a position closest to the object side and whose high-curvature surface faces the object side and a third lens unit image side lens element which is a negative lens element disposed at a position closest to the image side and concave in relation to the image side, and the following conditions are satisfied:

$$7.0 < L_W/f_W < 9.0 \tag{1}$$

$$1.5 < L_T/f_T < 2.1 \tag{2}$$

(here, $Z = f_T/f_W > 5.0$)

where $L_W$ is an optical overall length at a wide-angle limit, $f_W$ is a focal length of an entire lens system at the wide-angle limit, $L_T$ is an optical overall length at a telephoto limit, and $f_T$ is a focal length of the entire lens system at the telephoto limit Z is a magnification variation ratio at the wide-angle and telephoto limits.

* * * * *

UNITED STATES PATENT AND TRADEMARK OFFICE
CERTIFICATE OF CORRECTION

PATENT NO. : 7,126,762 B2 Page 1 of 1
APPLICATION NO. : 11/229828
DATED : October 24, 2006
INVENTOR(S) : Keiki Yoshitsugu It is certified that error appears in the above-identified patent and that said Letters Patent is hereby corrected as shown below:

On the title page;

Under item (56) References Cited, U.S. PATENT DOCUMENTS, change "2003/0197952 A1 10/2003 Eguchi" to -- 2003/0197950 A1 10/2003 Eguchi --

Signed and Sealed this

Seventeenth Day of April, 2007

JON W. DUDAS
*Director of the United States Patent and Trademark Office*